(12) United States Patent
Hsieh

(10) Patent No.: US 12,023,653 B2
(45) Date of Patent: Jul. 2, 2024

(54) SILVER-CONTAINING SOLUTION AND METHOD OF FORMING SILVER CATALYST LAYER IN CHEMICAL PLATING

(71) Applicant: INDUSTRIAL TECHNOLOGY RESEARCH INSTITUTE, Hsinchu (TW)

(72) Inventor: Hung-Yuan Hsieh, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 68 days.

(21) Appl. No.: 17/846,433

(22) Filed: Jun. 22, 2022

(65) Prior Publication Data
US 2023/0264177 A1    Aug. 24, 2023

(30) Foreign Application Priority Data

Feb. 22, 2022  (TW) .................................. 111106315

(51) Int. Cl.
| | |
|---|---|
| *B01J 23/50* | (2006.01) |
| *B01J 33/00* | (2006.01) |
| *B01J 35/39* | (2024.01) |
| *C23C 18/42* | (2006.01) |
| *C23C 28/02* | (2006.01) |

(52) U.S. Cl.
CPC ............... *B01J 23/50* (2013.01); *B01J 33/00* (2013.01); *B01J 35/39* (2024.01); *C23C 18/42* (2013.01); *C23C 28/023* (2013.01)

(58) Field of Classification Search
None
See application file for complete search history.

(56) References Cited

U.S. PATENT DOCUMENTS

| | | | | |
|---|---|---|---|---|
| 2003/0000846 A1* | 1/2003 | Rzeznik | .............. | C23C 18/1834 205/261 |
| 2010/0187081 A1 | 7/2010 | Kim et al. | | |
| 2015/0174554 A1* | 6/2015 | Cao | ...................... | B01J 37/0213 502/348 |

(Continued)

FOREIGN PATENT DOCUMENTS

| | | | |
|---|---|---|---|
| CN | 1156607 A | | 8/1997 |
| CN | 101015860 A | * | 8/2007 |

(Continued)

OTHER PUBLICATIONS

CN-101015860-A—English translation (Year: 2007).*
Taiwanese Office Action and Search Report for Taiwanese Application No. 111106315, dated Aug. 25, 2022.

*Primary Examiner* — Stefanie J Cohen
(74) *Attorney, Agent, or Firm* — Birch, Stewart, Kolasch & Birch, LLP

(57) ABSTRACT

A method of forming a silver catalyst layer in chemical plating includes providing a substrate; applying a silver-containing solution onto the substrate; and applying energy of activation to the silver-containing solution to form a silver catalyst layer over the substrate. The silver-containing solution includes silver ions, a diamine compound, a carboxylic acid compound, and a solvent. In addition, the substrate having the silver catalyst layer thereon can be immersed into a chemical plating solution to form a metal layer over the silver catalyst layer.

15 Claims, 24 Drawing Sheets

(56) References Cited

U.S. PATENT DOCUMENTS

2020/0061704 A1    2/2020  Kim et al.
2020/0113063 A1    4/2020  Pope et al.

FOREIGN PATENT DOCUMENTS

| | | |
|---|---|---|
| CN | 101801874 A | 8/2010 |
| CN | 105074051 A | 11/2016 |
| CN | 111318689 A | 6/2020 |
| CN | 113293364 A | 8/2021 |
| EP | 3 249 074 A1 | 11/2017 |
| JP | 10-30188 A | 2/1998 |
| JP | 2004-190066 A | 7/2004 |
| JP | 2004-238731 A | 8/2004 |
| JP | 2003-82466 A | 3/2008 |
| JP | 2012-255182 A | 12/2012 |
| JP | 2013-47385 A | 3/2013 |
| JP | 6038818 B2 | 11/2016 |
| JP | 2021-80513 A | 6/2021 |
| TW | 200407458 A | 5/2004 |
| TW | 201213606 A1 | 4/2012 |
| TW | 201137185 A1 | 11/2013 |
| TW | 201432089 A | 8/2014 |
| TW | 202041713 A | 11/2020 |

\* cited by examiner

SILVER-CONTAINING SOLUTION AND METHOD OF FORMING SILVER CATALYST LAYER IN CHEMICAL PLATING

CROSS REFERENCE TO RELATED APPLICATIONS

The present application is based on, and claims priority from, Taiwan Application Serial Number 111106315, filed on Feb. 22, 2022, the disclosure of which is hereby incorporated by reference herein in its entirety.

TECHNICAL FIELD

The technical field relates to the method of forming a silver catalyst layer in a chemical plating process, and in particular it relates to the silver-containing solution for the process.

BACKGROUND

Palladium metal is widely used in chemical processing as a catalyst to trigger a reaction, but palladium is expensive. It is always a trend of technological development to replace palladium with other materials. The catalytic property of silver is close to that of palladium, which can be readily activated with low-energy stimulation. In addition, the price of silver is much cheaper than that of palladium. However, silver is much more sensitive to light, and thereby not often adopted due to undergoing changes over time beyond control, which is especially detrimental to quality-control in industrial manufacturing. Although silver nitrate is relatively less sensitive than most of other silver compounds, it is still quite easily affected by light. If silver nitrate is directly used as an ink in inkjet-printing process, it will generate particulate precipitates due to autocatalysis and consequently clog the ink-jetting nozzles, and severely degrade the quality of the printed products.

Earlier there are many research on silver-amine complexes. Although advances have been made, stability of these complexes is not stable or even poses risk of explosion. If solution of nano-silver colloid instead of the silver complex is used, it often aggregates, or even form sedimentation products, and therefore its effectiveness and reliability remain uncertain. Recently, graphene-oxide flakes have been used as adsorptive and reductive sites in some research, but the graphene must be prepared through a complicated processes in strong acids which is also very energy and time consuming and expensive to carry out. Besides, separating and purifying the graphene also generates large quantity of waste water and acid. Compared to palladium, graphene is not cost effective at all. Alternatively, polydopamine may serve as a adsorption carrier and chemical reduction sites. The cost of polydopamine is, however, only just little bit lower than that of graphene, because raw materials from which polydopamine is made are still quite expensive. In addition, the process of preparing the polydopamine needs high-speed centrifugation and dialysis for purification, which generate many waste byproducts.

Accordingly, the method to improve the stability of the silver-containing solution for preparing the silver catalyst layer is called for. This would be beneficial to the chemical plating process.

SUMMARY

One embodiment of the disclosure provides a silver-containing solution, including silver ions; a diamine compound; a carboxylic acid compound; and a solvent.

In some embodiments, the silver-containing solution has a silver ion concentration of 0.01 M to 10 M.

In some embodiments, the diamine compound includes ethylene diamine, propylene diamine, or a combination thereof, and the diamine to the silver ions have a molar concentration ratio of 2.5:1 to 200:1.

In some embodiments, the carboxylic acid compound includes formic acid, acetic acid, citric acid, oxalic acid, malic acid, or a combination thereof, and the carboxylic acid compound to the silver ions have a molar concentration ratio of 0.1:1 to 1.2:1.

In some embodiments, the solvent includes water, alcohol, or a combination thereof.

In some embodiments, the silver-containing solution further includes a dispersant.

One embodiment of the disclosure provides a method of forming a silver catalyst layer in chemical plating, including providing a substrate; applying a silver-containing solution onto the substrate; and applying energy of activation to the silver-containing solution to form a silver catalyst layer on the substrate. The silver-containing solution includes: silver ions; a diamine compound; a carboxylic acid compound; and a solvent.

In some embodiments, the silver-containing solution has a silver ion concentration of 0.01 M to 10 M.

In some embodiments, the diamine compound includes ethylene diamine, propylene diamine, or a combination thereof, and the diamine to the silver ions have a molar concentration ratio of 2.5:1 to 200:1.

In some embodiments, the carboxylic acid compound includes formic acid, acetic acid, citric acid, oxalic acid, malic acid, or a combination thereof, and the carboxylic acid compound to the silver ions have a molar concentration ratio of 0.1:1 to 1.2:1.

In some embodiments, the solvent includes water, alcohol, or a combination thereof.

In some embodiments, the silver-containing solution further includes a dispersant.

In some embodiments, the energy of activation includes plasma, intensive pulsed light (IPL), ultraviolet radiation (UV), or laser.

In some embodiments, the method further includes immersing the substrate having the silver catalyst layer thereon into a chemical plating solution to form a metal layer over the silver catalyst layer.

In some embodiments, the chemical plating solution includes copper ions or nickel ions, and the metal layer includes a copper layer or a nickel layer.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
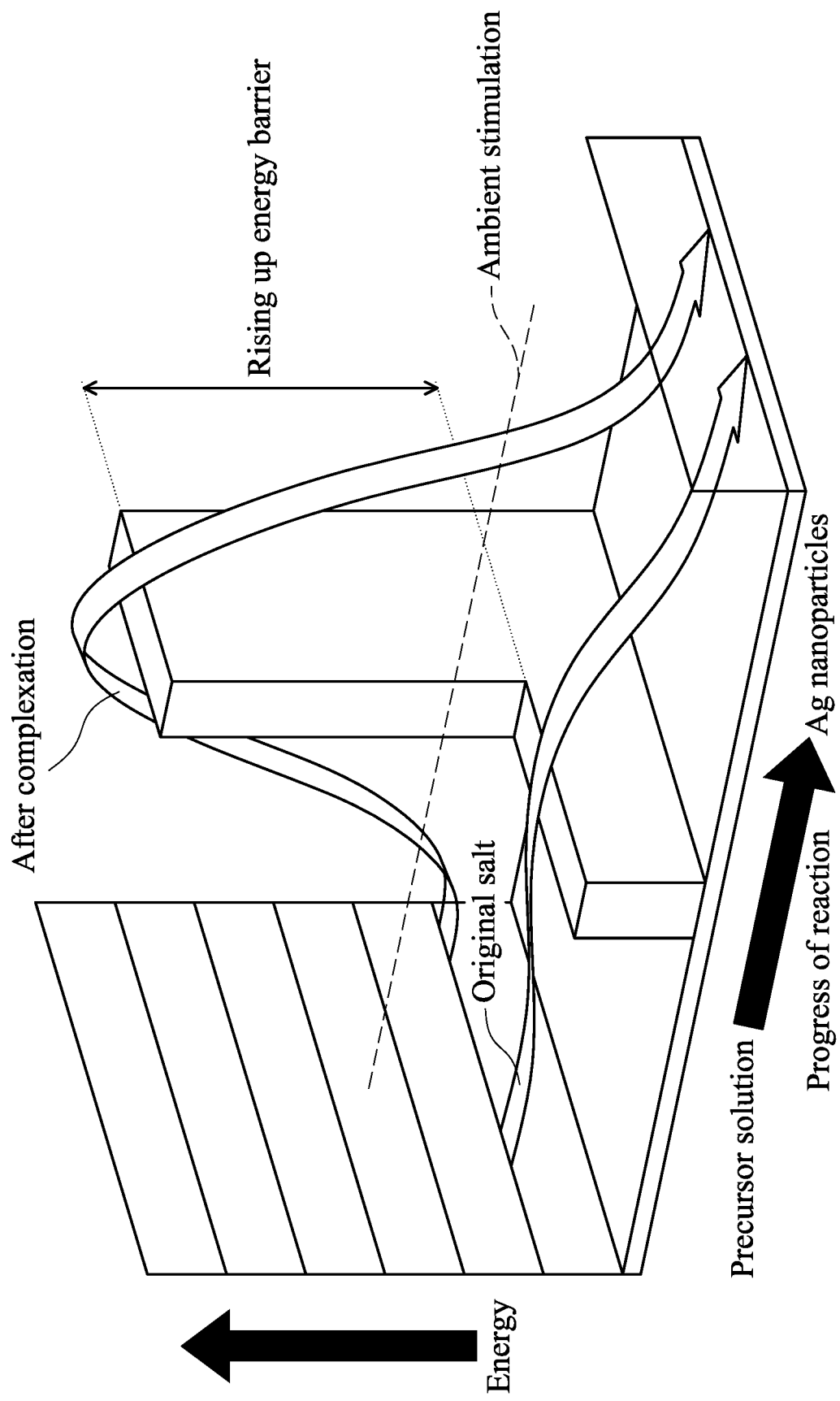
FIG. 1 shows an energy barrier diagram of silver nanoparticles formed from a silver salt and a silver complex, respectively.
Figure 2A:
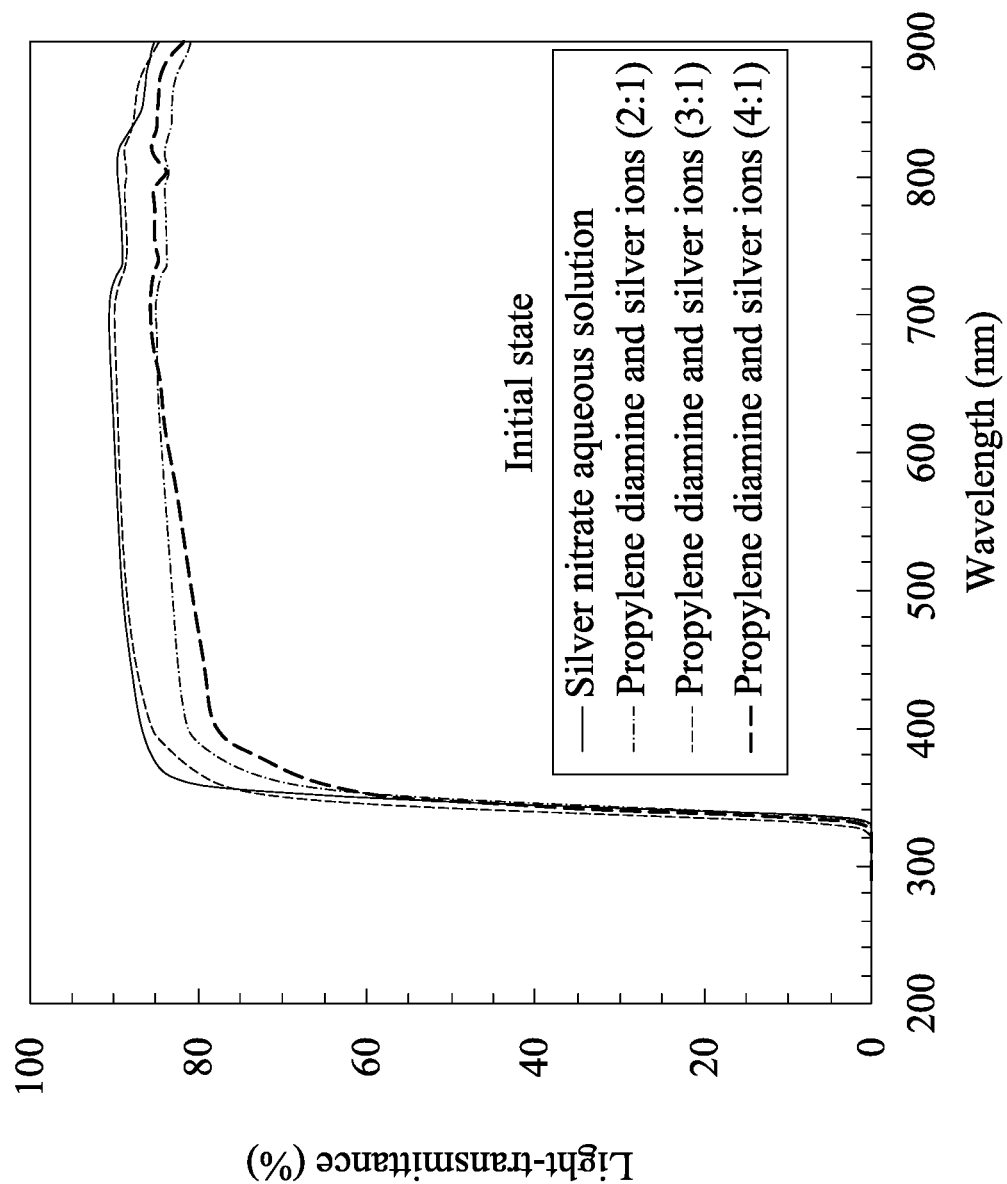
FIGS. 2A to 2D show the light-transmittance spectra of the silver-containing solutions in one embodiment of the disclosure.
Figure 2B:
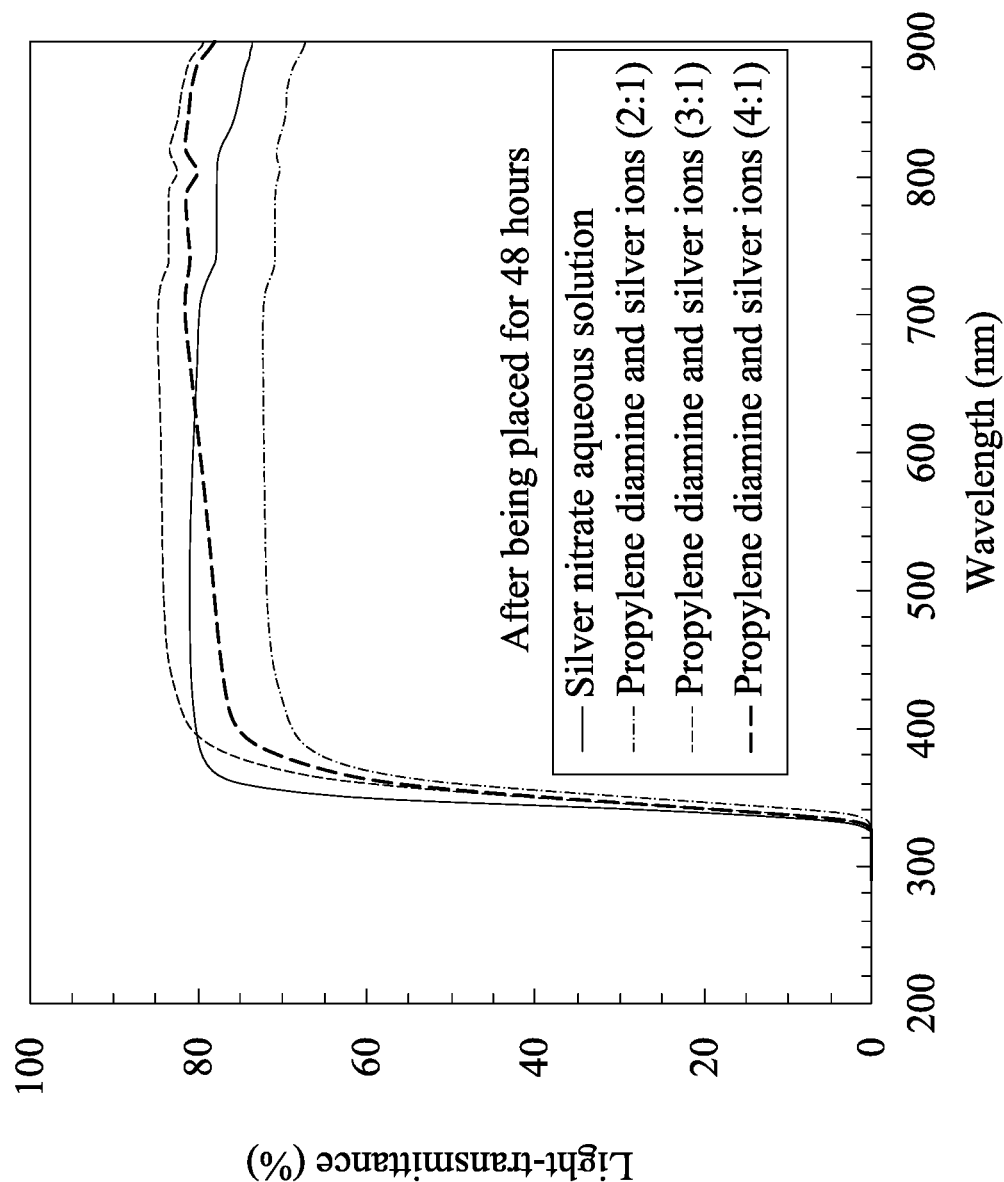
Figure 2C:
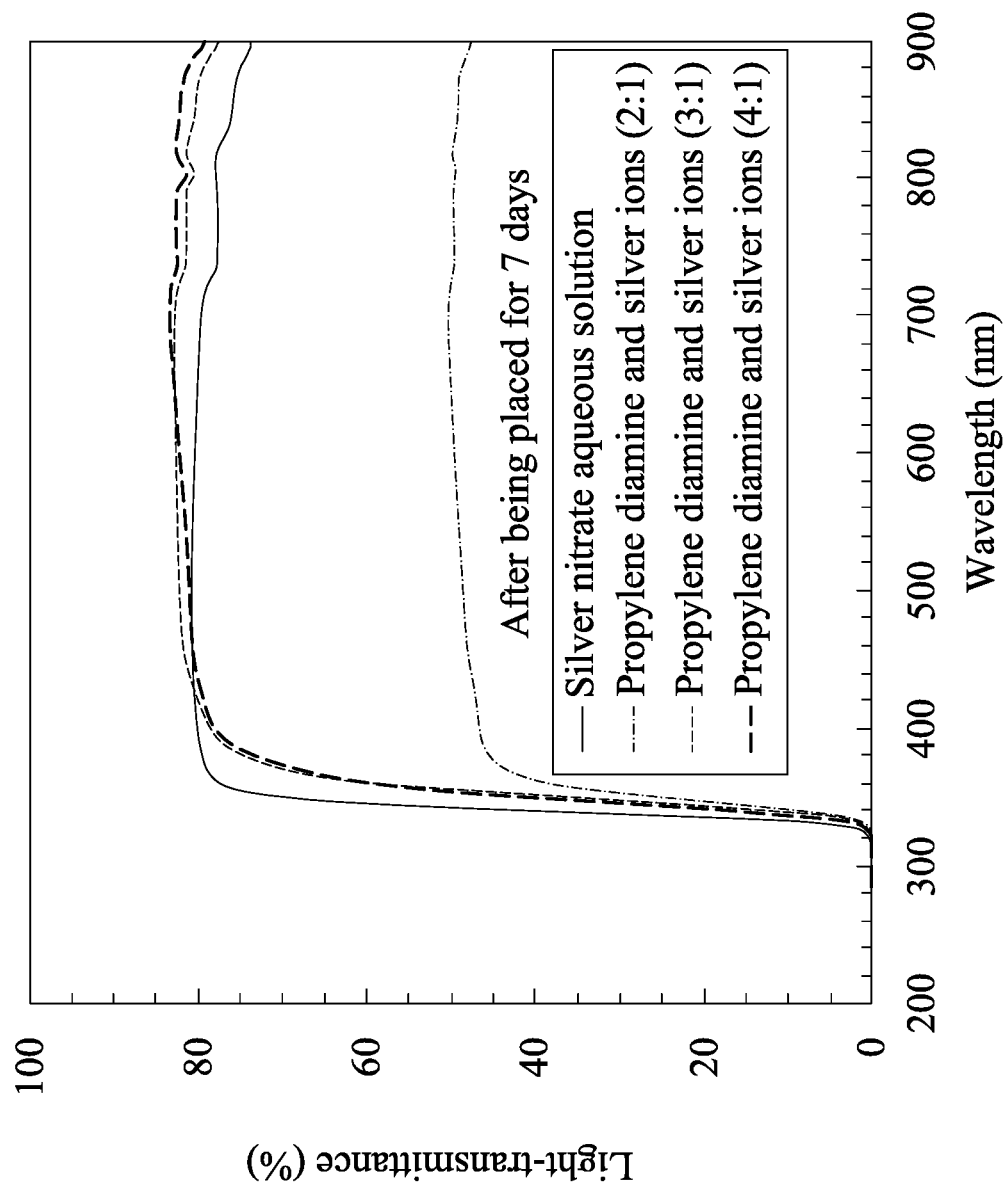
Figure 2D:
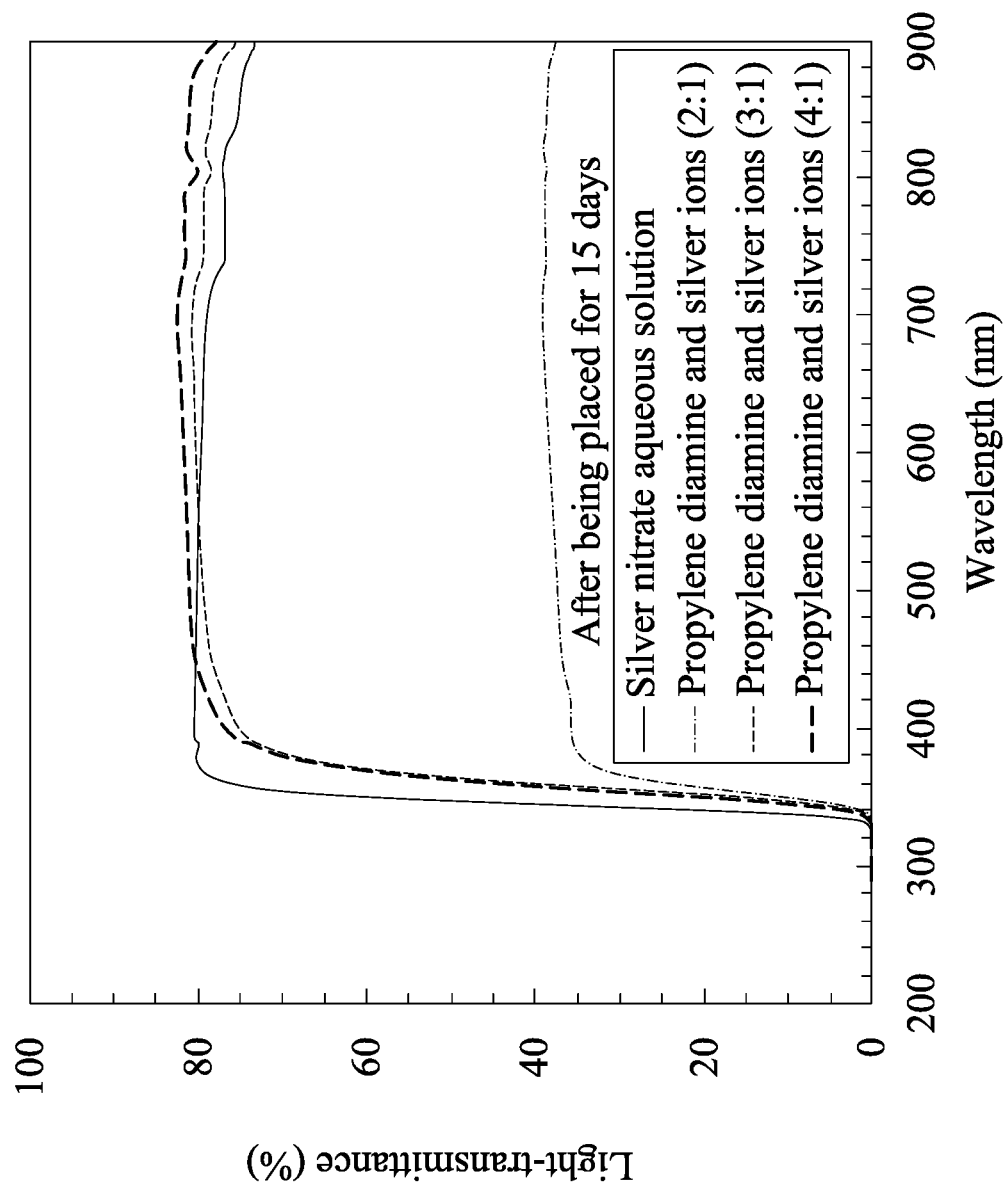
Figure 3A:
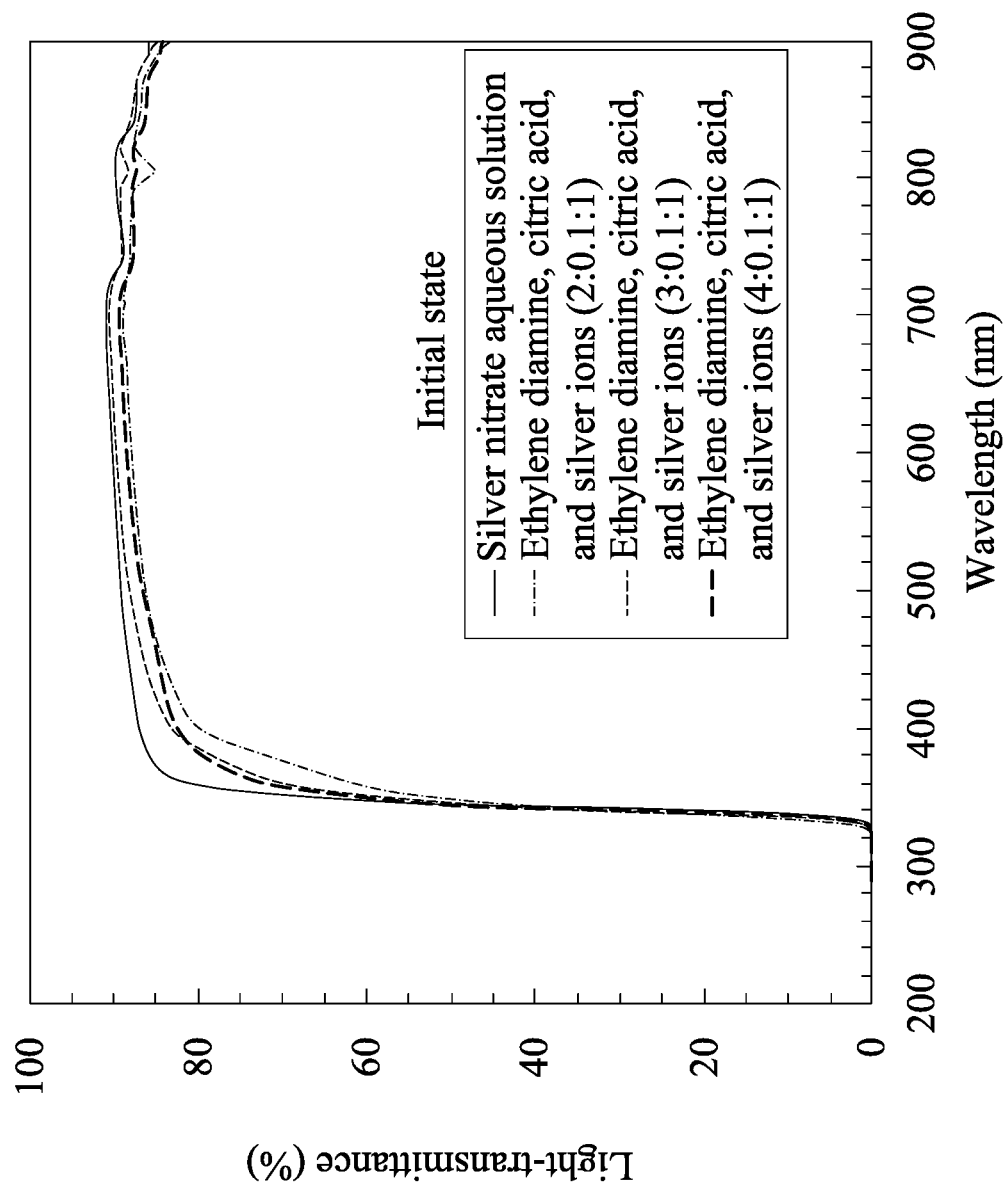
FIGS. 3A to 3D show the light-transmittance spectra of the silver-containing solutions in one embodiment of the disclosure.
Figure 3B:
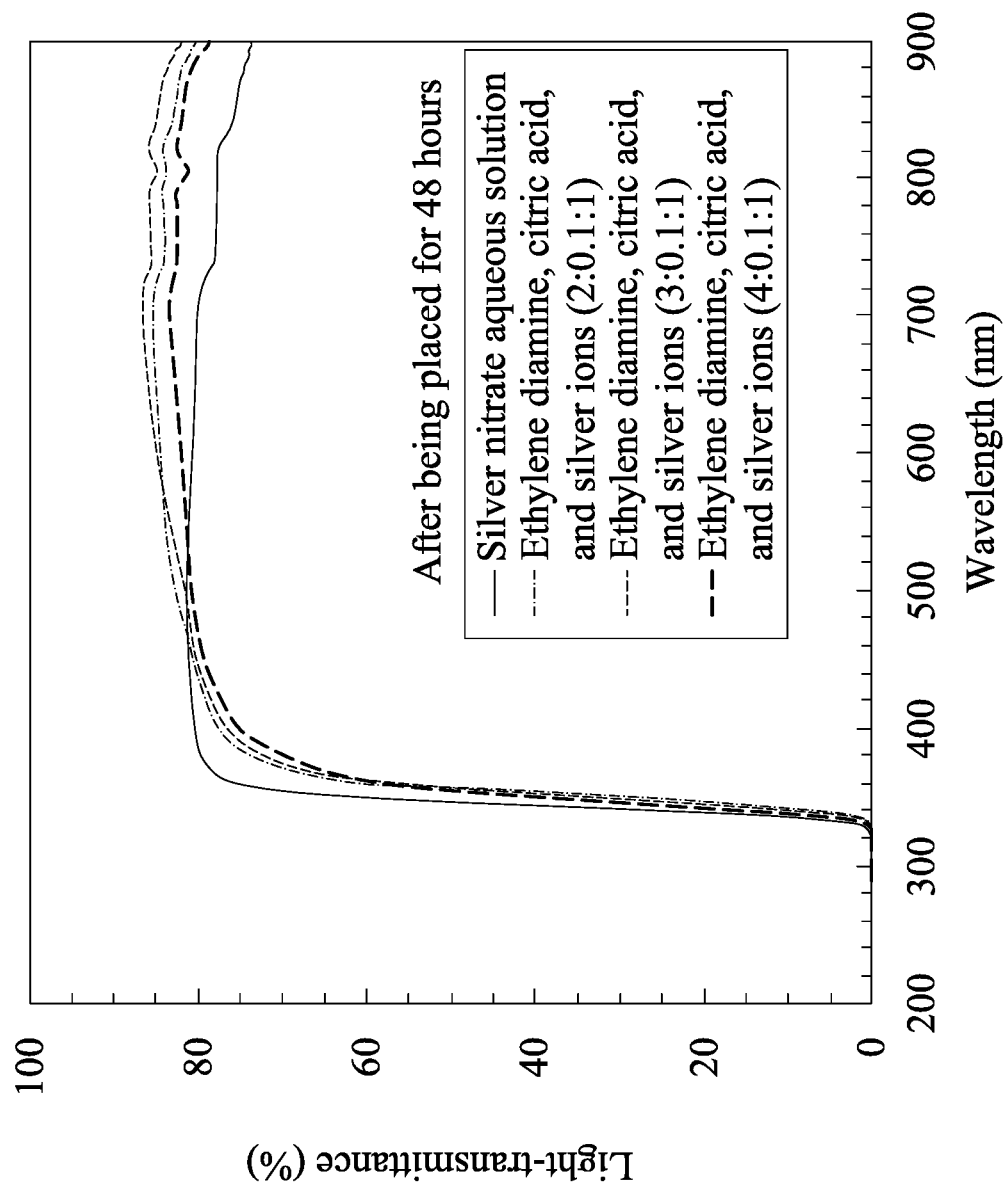
Figure 3C:
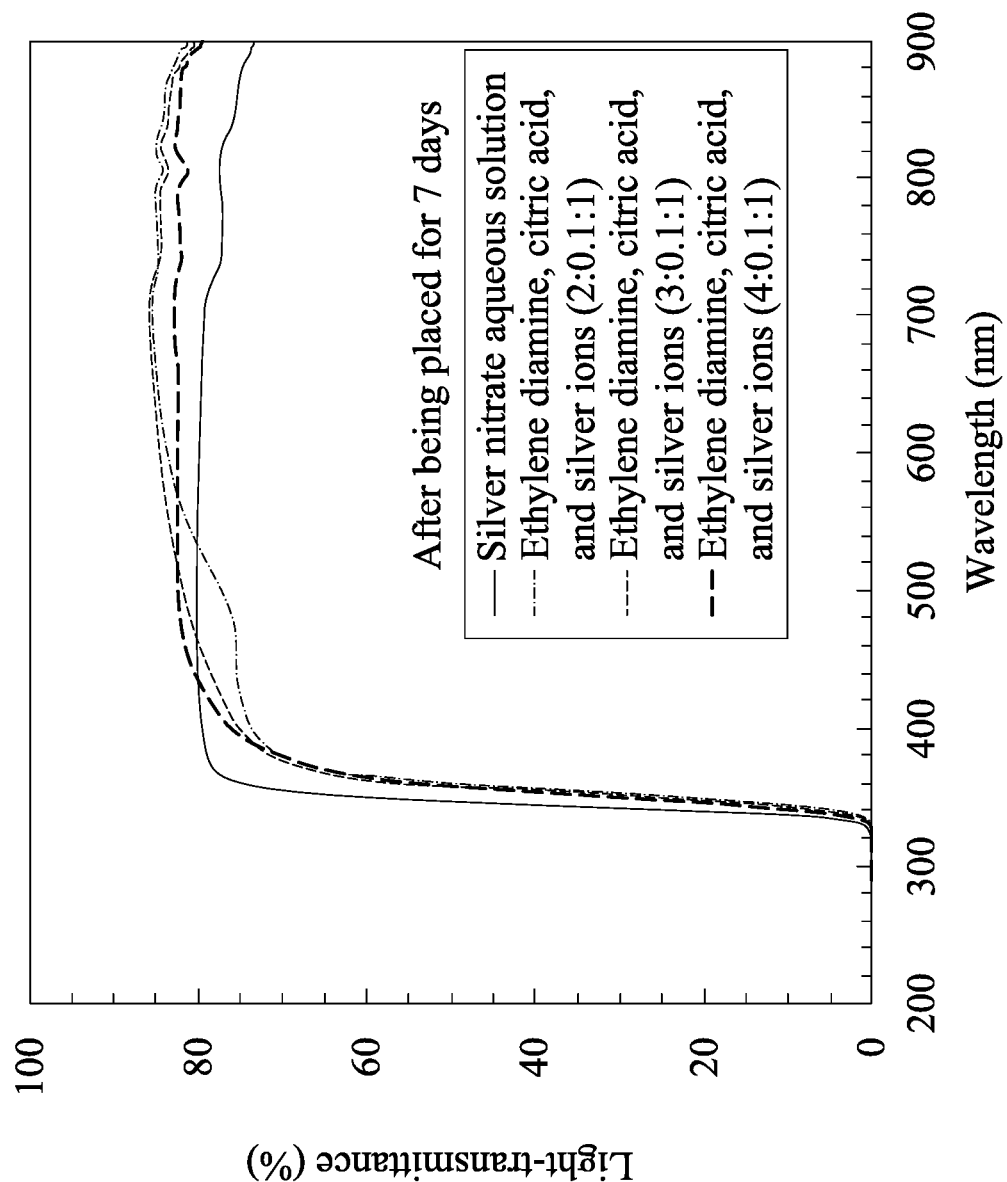
Figure 3D:
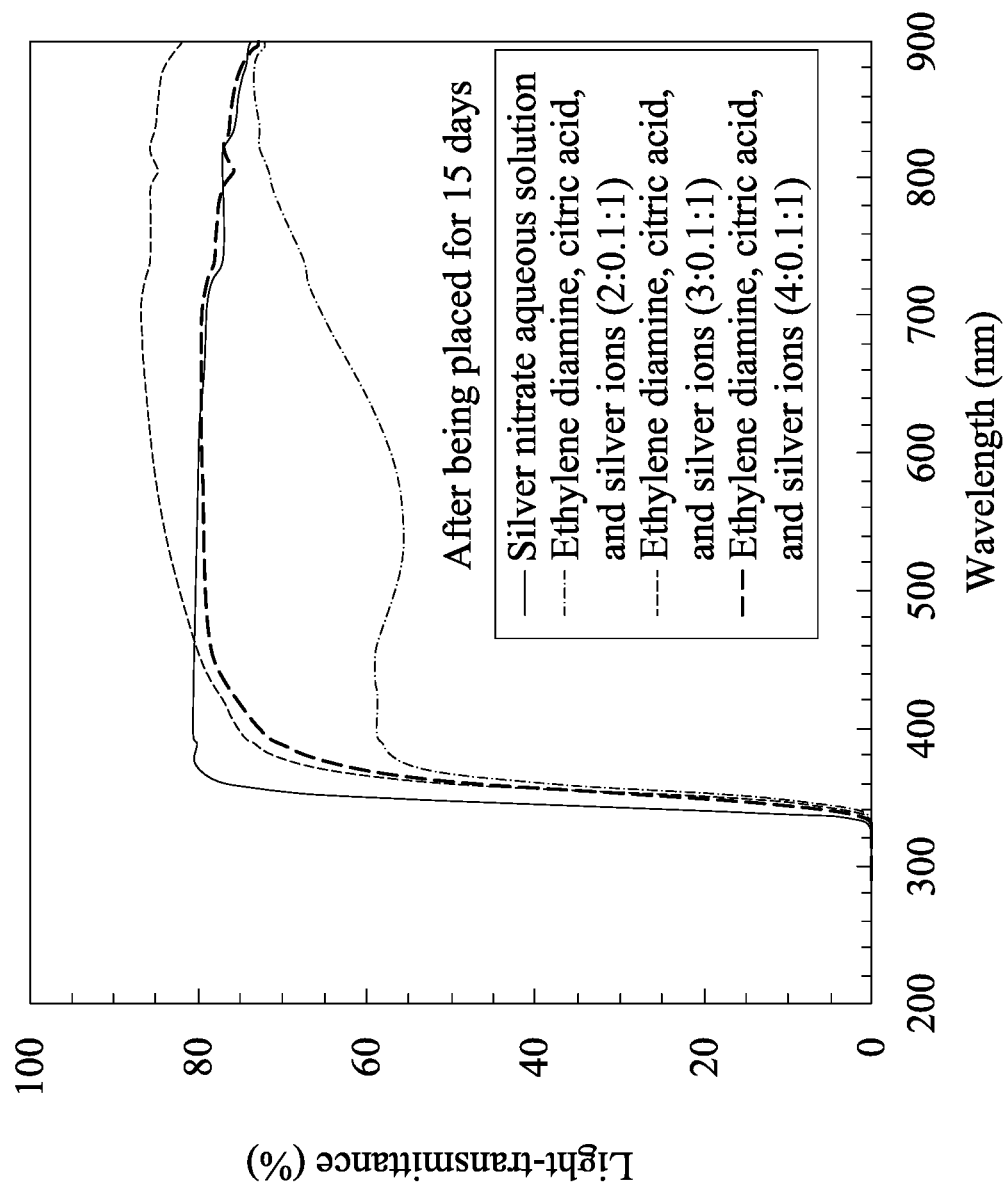
Figure 4A:
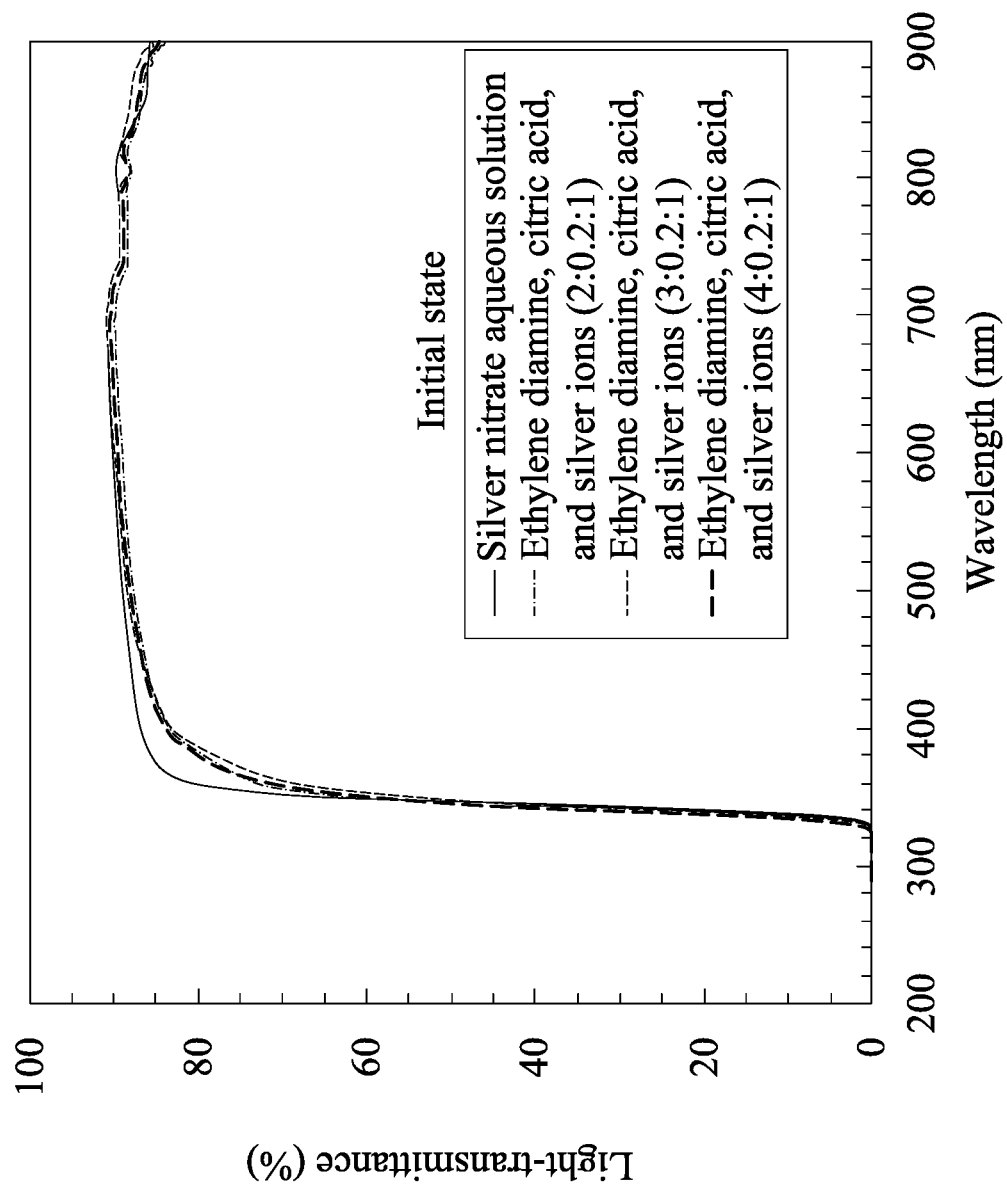
FIGS. 4A to 4D show the light-transmittance spectra of the silver-containing solutions in one embodiment of the disclosure.
Figure 4B:
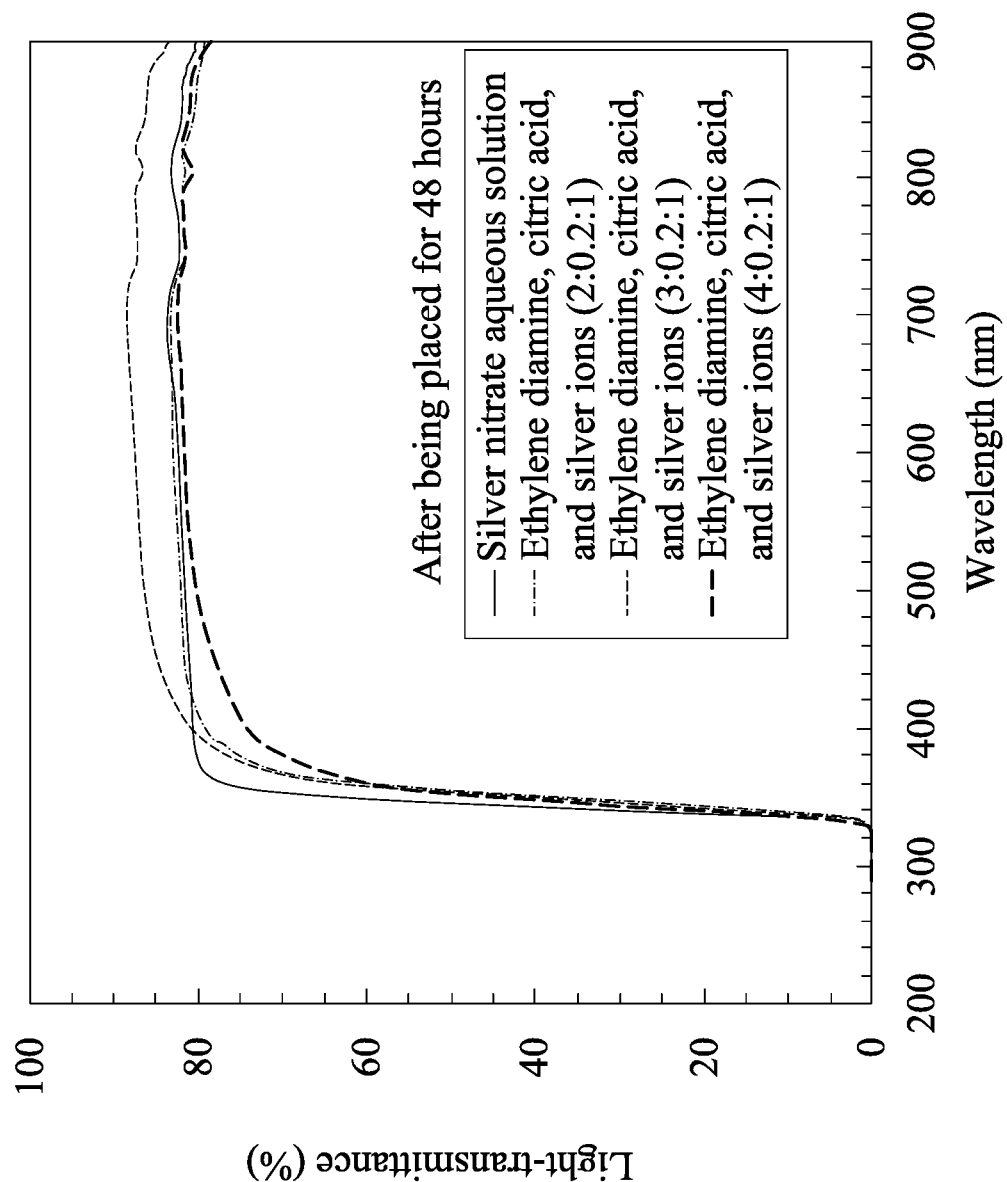
Figure 4C:
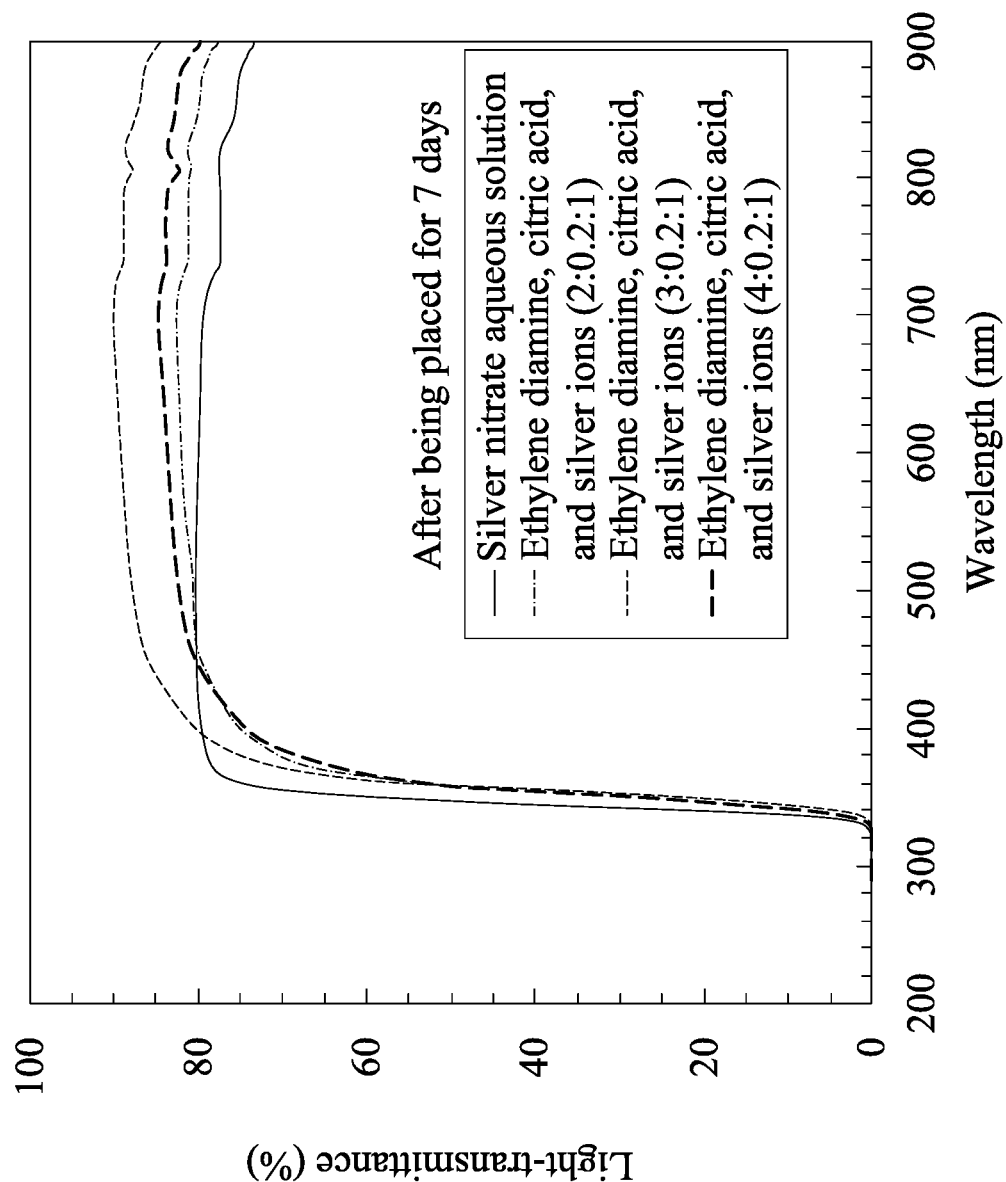
Figure 4D:
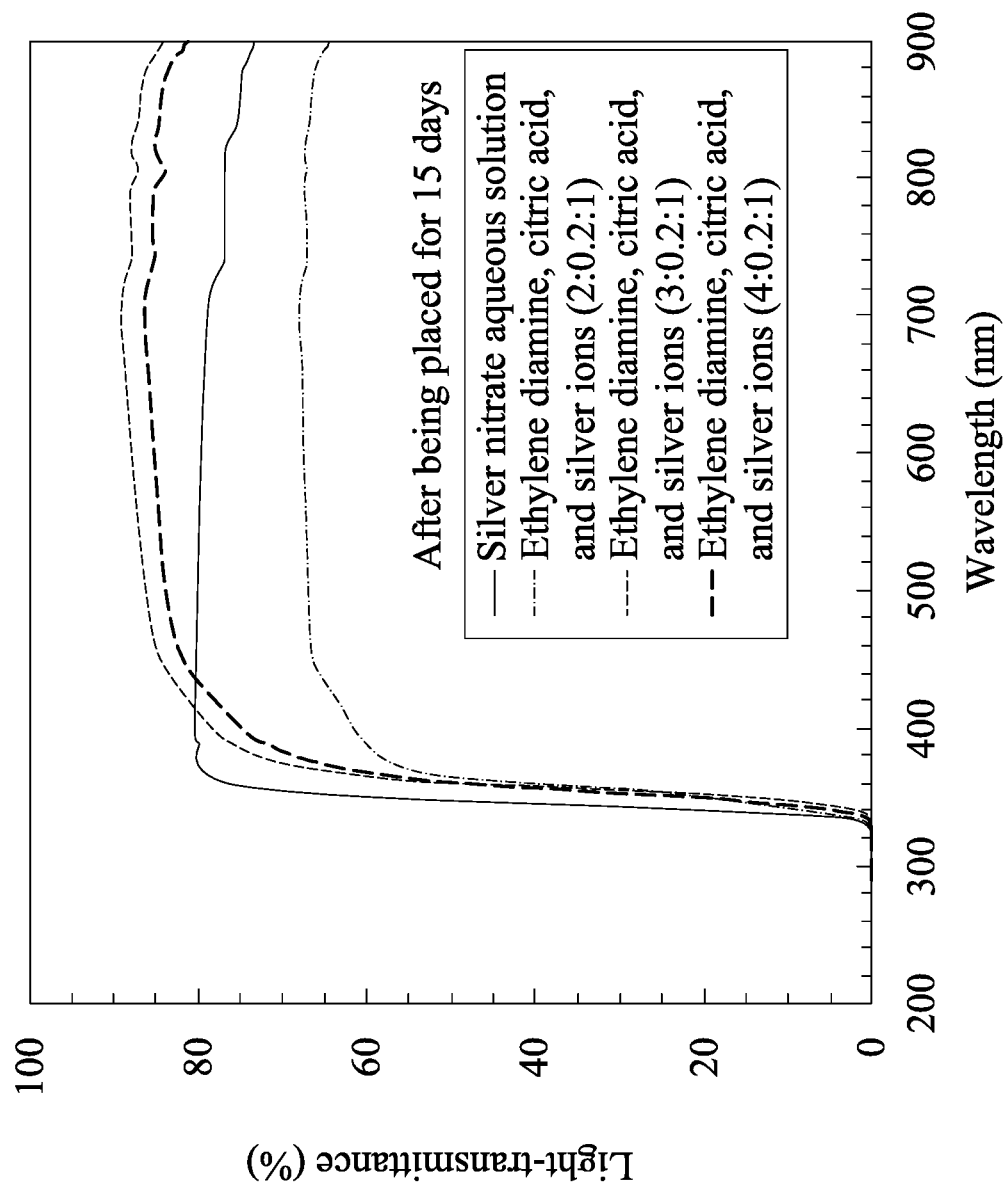
Figure 5A:
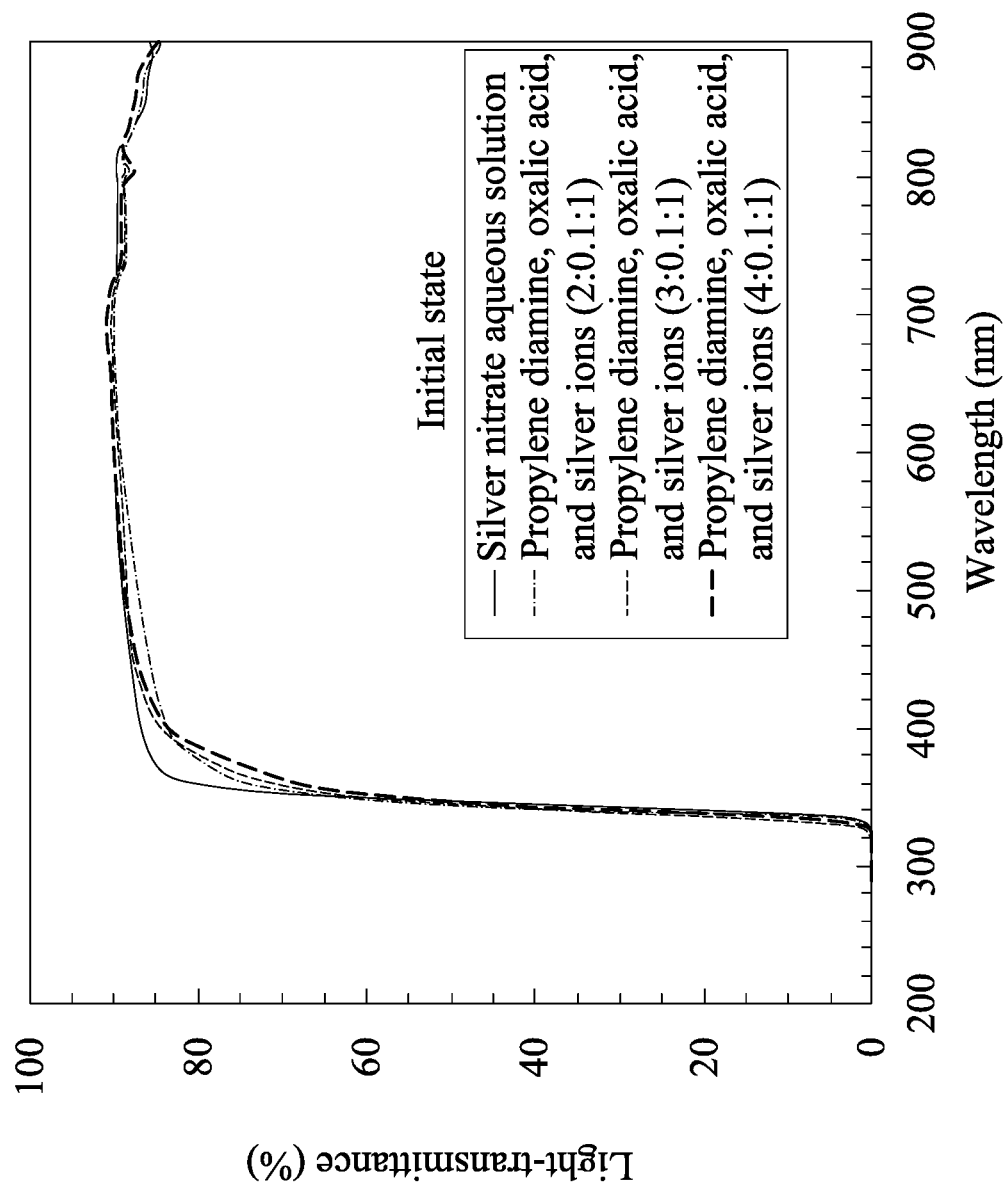
FIGS. 5A to 5D show the light-transmittance spectra of the silver-containing solutions in one embodiment of the disclosure.
Figure 5B:
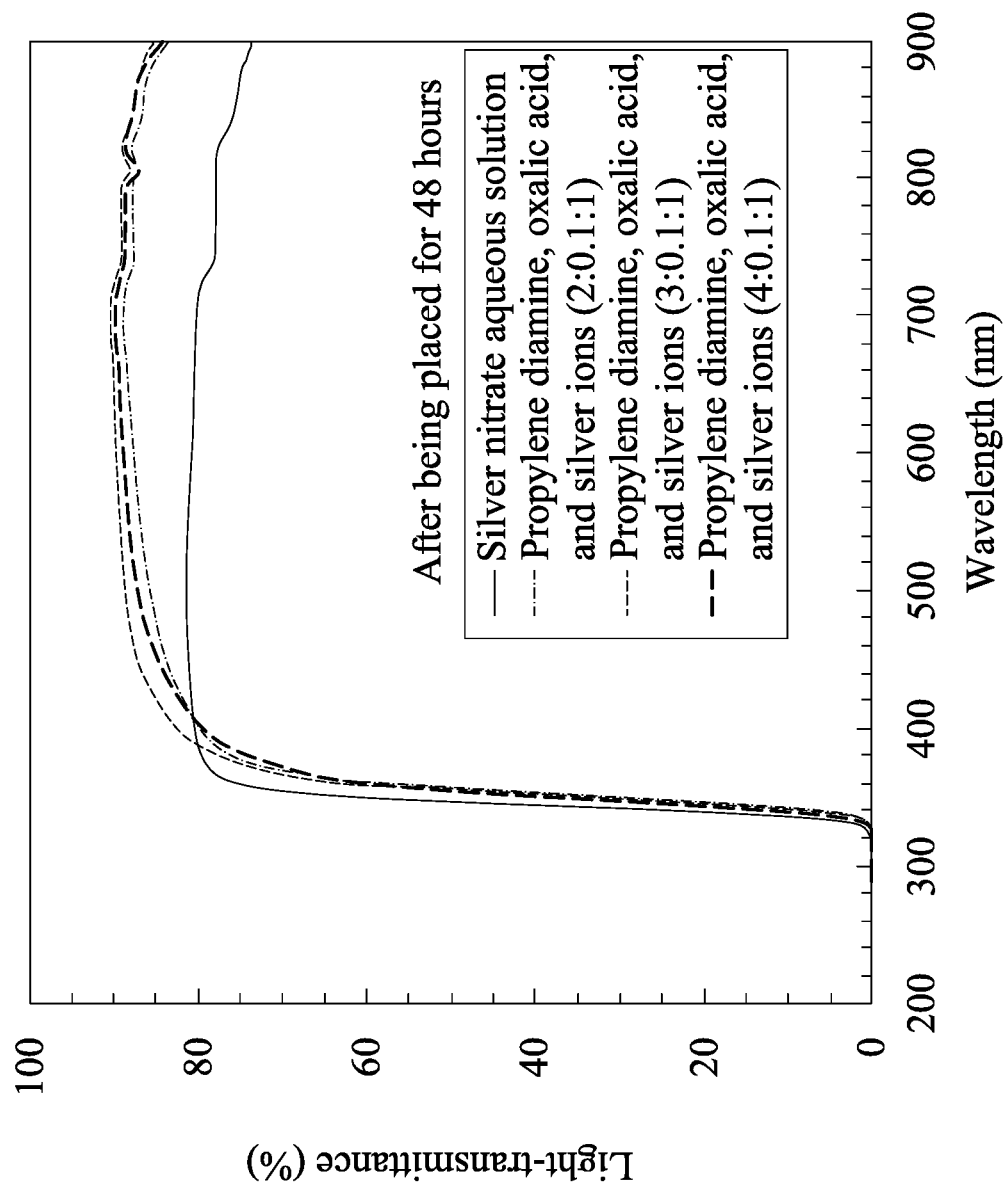
Figure 5C:
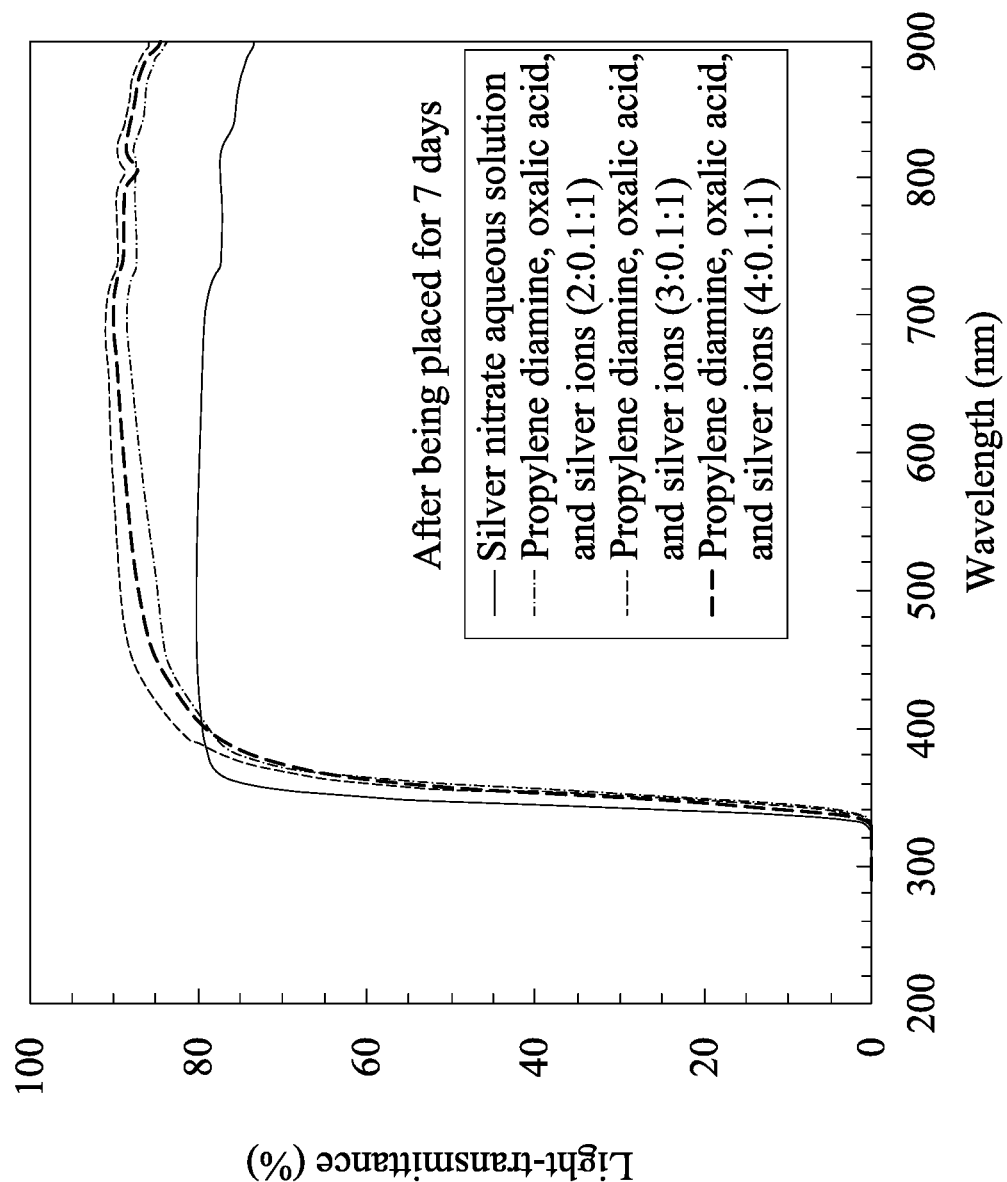
Figure 5D:
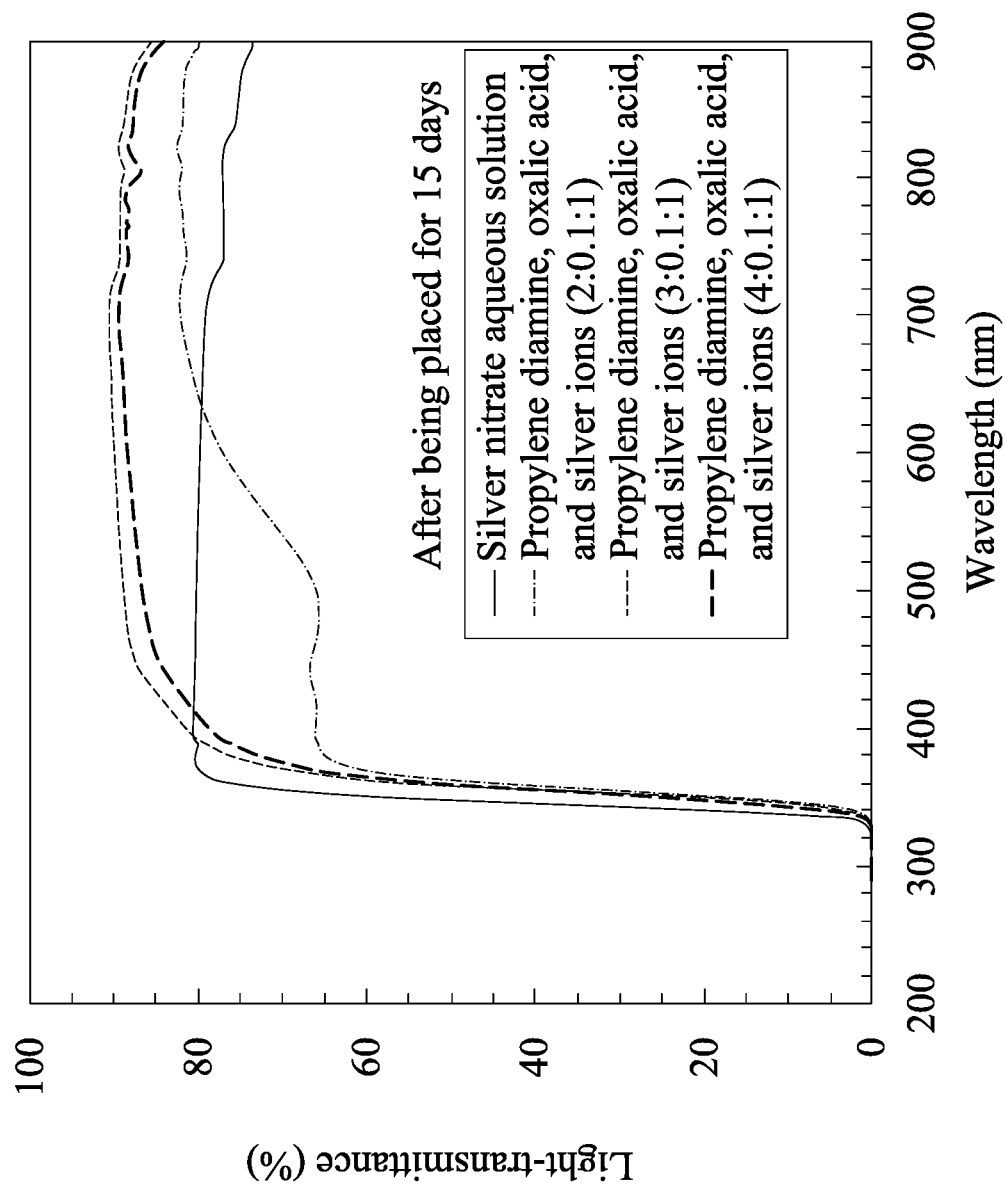
Figure 6A:
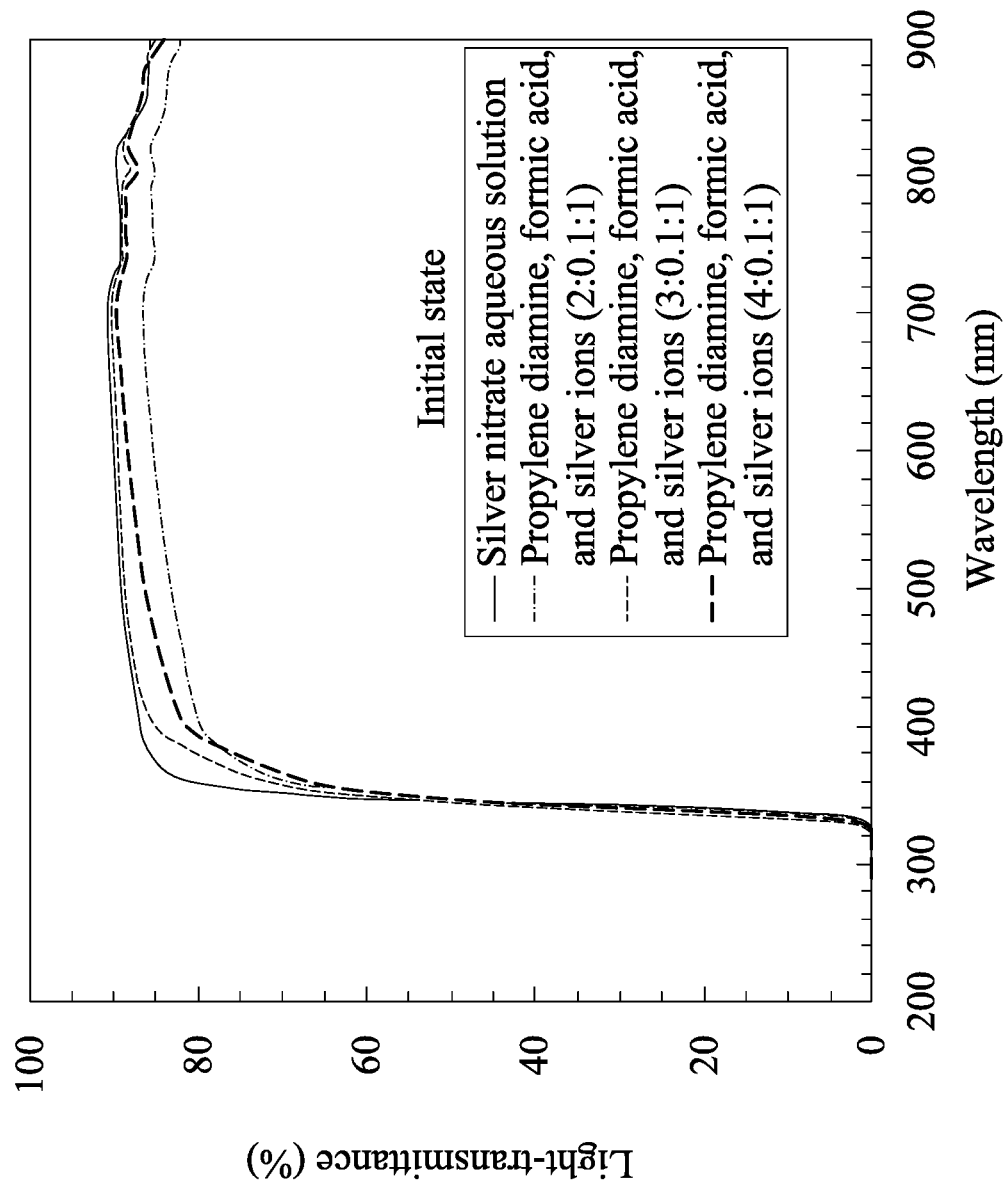
FIGS. 6A to 6D show the light-transmittance spectra of the silver-containing solutions in one embodiment of the disclosure.
Figure 6B:
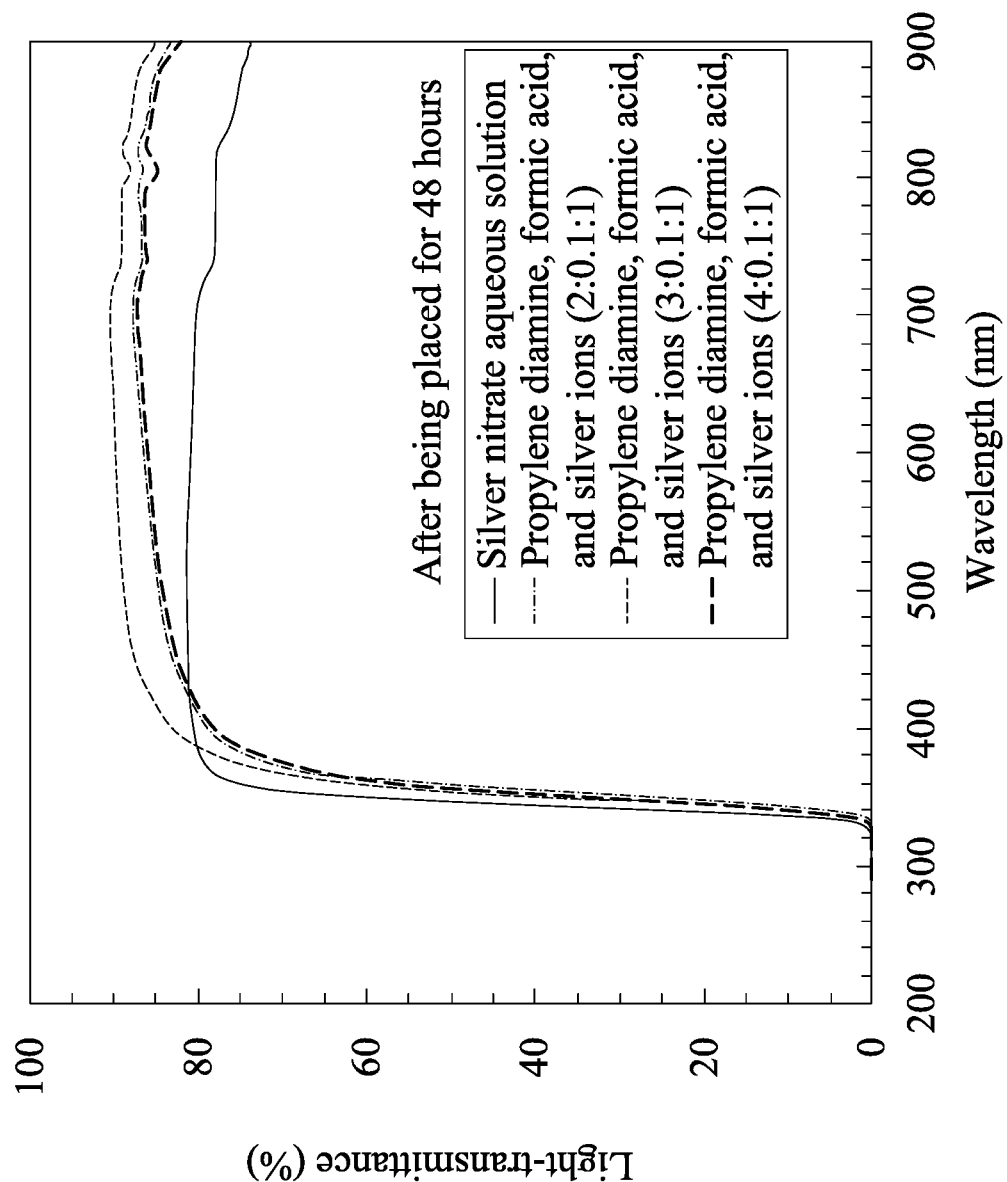
Figure 6C:
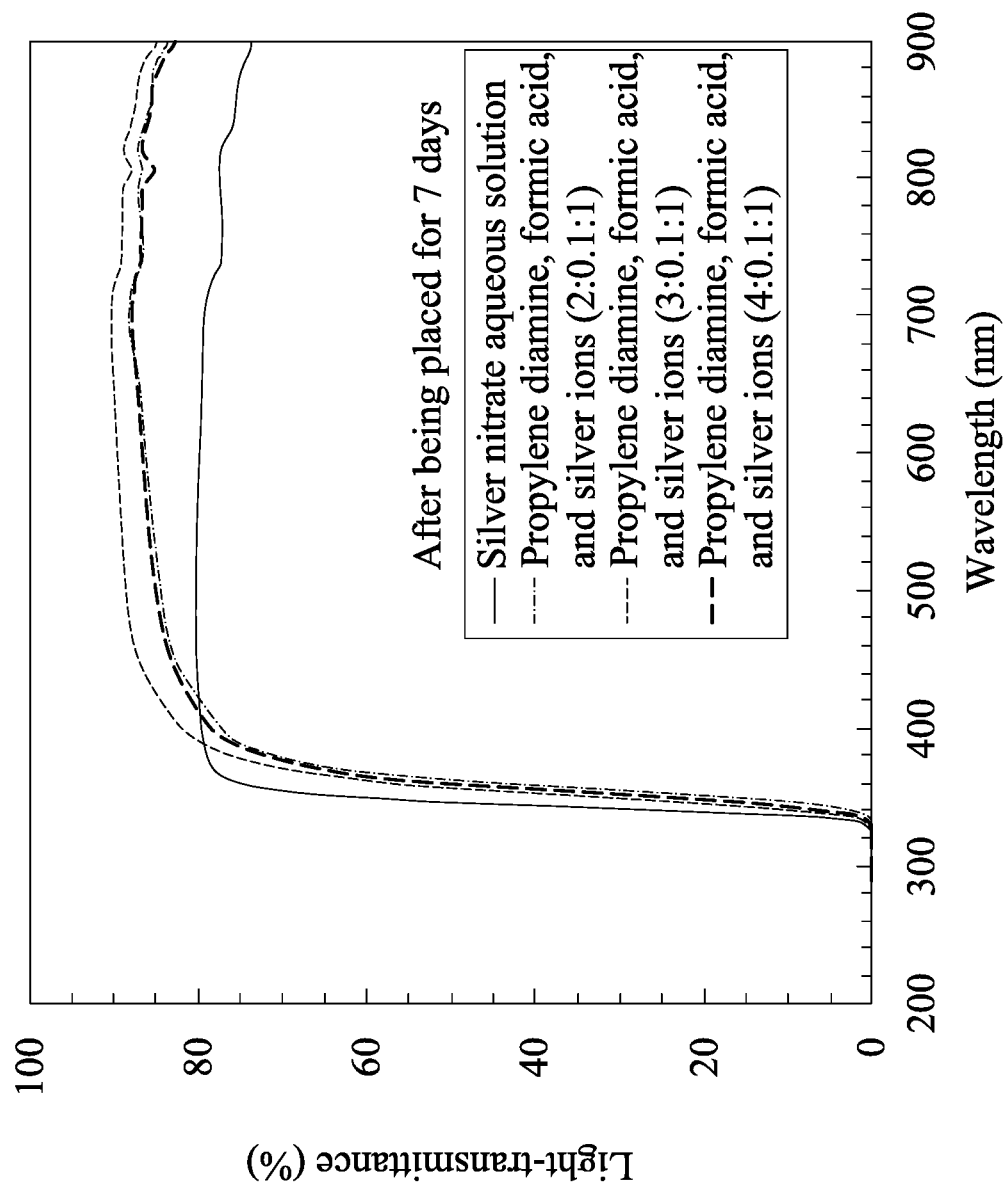
Figure 6D:
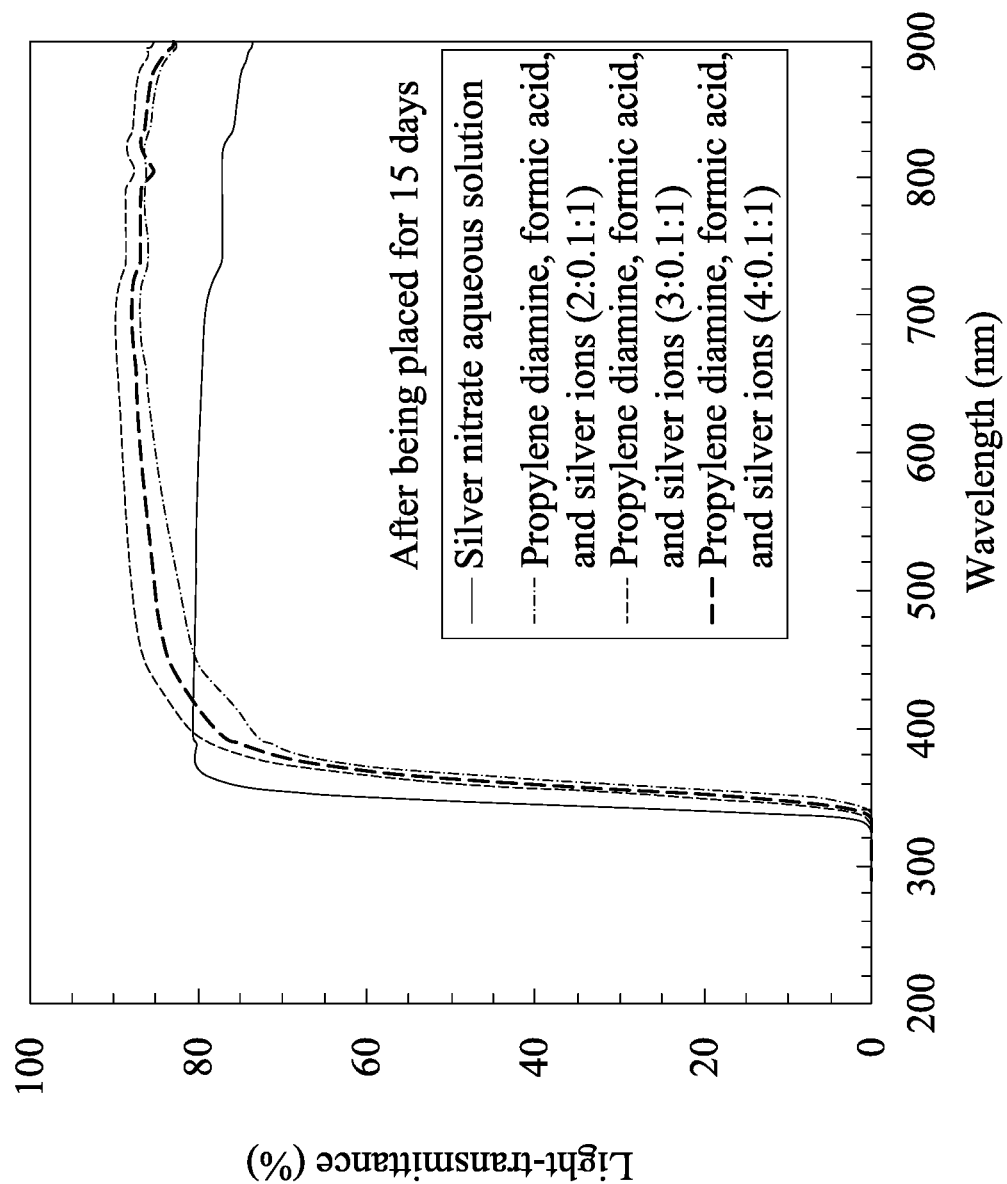

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The silver salt is highly light sensitive, which spontaneously precipitates the silver nanoparticles under light stimulation to be used as a catalyst. However, the precipitated silver nanoparticles are naturally aggregate to bother the application, such as clogging the inkjet nozzle or continuously varying the active concentration of the silver-containing solution (the active concentration is therefore difficult to control). The disclosure transforms the silver ions into a complex that is not sensitive to ambient (normal environment) light to solve the above issues. The threshold energy barrier of photo-induced precipitation is increased, thereby stabilizing the silver complex under an ambient-light condition. In practice, an energy level higher than the threshold energy barrier is applied to quickly precipitate the silver nanoparticles for fitting the applications that utilize its particular characteristics, as shown in FIG. 1.

One embodiment of the disclosure provides a method of forming a silver catalyst layer in chemical plating, including providing a substrate. In some embodiments, the substrate can be a glass substrate, a metal substrate, a ceramic substrate, a plastic substrate, or another suitable substrate. Another material layer such as dielectric layer, semiconductor layer, metal layer, or another suitable material layer can be formed over the substrate. The material layer can be patterned to form a device such as semiconductor device, interconnect device, or another electronic device. In other words, the method of the disclosure can be utilized to form an electronic device or an intermediate structure thereof.

Subsequently, a silver-containing solution is applied onto the substrate by spray coating, spin-on coating, screen printing, inkjet printing, immersing coating, or another suitable process. Subsequently, an external energy of activation is applied to the silver-containing solution to form a silver catalyst layer on the substrate. The energy may induce a process which chemically reduces the silver ions in the silver-containing solution to metal silver. For example, the external energy of activation can be plasma, intensive pulsed light (IPL), ultraviolet (UV) radiation, laser, or another suitable form of energy.

In some embodiments, the silver-containing solution includes silver ions, a diamine compound, a carboxylic acid compound, and a solvent. For example, the silver-containing solution in some embodiments has a silver ion concentration of 0.01 M to 10 M. If the silver ion concentration is too low, it cannot form a sufficient silver catalyst layer to catalyze the following chemical plating process. If the silver ion concentration is too high, the silver-containing solution may not suitable to be used in specific process such as inkjet printing. In addition, if the silver ion concentration is too high, the silver-containing solution may not be stored for a long time with stable qualities.

In some embodiments, the diamine compound includes ethylene diamine, propylene diamine, or a combination thereof, and the diamine to the silver ions have a molar concentration ratio of 2.5:1 to 200:1. If the amount of the diamine compound is too low, the silver-containing solution may prematurely precipitate some particulates after being aged for a short time, which means that the silver-containing solution cannot be stored for a long time with stable qualities. If the amount of the diamine compound is too high, the solution will be overly diluted and insufficient to achieve the expected catalytic activity of silver.

In some embodiments, the carboxylic acid includes formic acid, acetic acid, citric acid, oxalic acid, malic acid, or a combination thereof, and the carboxylic acid compound to the silver ions have a molar concentration ratio of 0.1:1 to 1.2:1. If the amount of the carboxylic acid compound is too low, the silver-containing solution may prematurely precipitate some particulates after being aged for a short time, which means that the silver-containing solution cannot be stored for a long time with stable qualities. If the amount of the carboxylic acid compound is too high, the stability of the complexation of silver and diamine will be destroyed, thereby promoting precipitation from chemically induced reduction instead. In other words, too much carboxylic acid compound is detrimental to maintain stability and clarity of the silver-containing solution.

In some embodiments, the solvent includes water, alcohol, or a combination thereof. For example, the alcohol can be methanol, ethanol, isopropanol, butanol, or a combination thereof.

In some embodiments, the silver-containing solution further includes a dispersant. For example, the dispersant can be polymer dispersant such as polyvinylpyrrolidone (PVP), polyvinyl alcohol (PVA), polyethyleneimine (PEI), polyethylene glycol (PEG), or another suitable polymer, or cationic dispersant such as sodium dodecyl sulfate (SDS), sodium lauryl sulfate (SLS), or another suitable cationic dispersant.

In some embodiments, the method further includes immersing the substrate having the silver catalyst layer thereon into a chemical plating solution for forming a metal layer over the silver catalyst layer. The chemical plating solution includes copper ions or nickel ions, and the metal layer includes a copper layer or a nickel layer. In this embodiment, the silver catalyst layer serves as a catalytic layer to trigger chemical plating of the metal layer.

Accordingly, the disclosure develops a complex formulation technology, in which silver salts can be transformed and dissolved into a relative stable aqueous solution through appropriate proportioning of simple starting materials. The technology has several advantages, such as the starting materials being easily accessible, and mixing process being simple and low cost (free of the expensive palladium). The threshold energy of precipitating the silver in complex by photo-catalysis is enhanced, such that ambient light no longer affect the silver complex that much. The silver complex can be activated in practice by applying an energy of activation over the new threshold, and results in fully manipulating catalytic activity of the silver particles.

It is observed that the solution having a certain amine/silver molar ratio (e.g., amine/silver≥2) can be mixed with varying amount of carboxylic acid (carboxylic acid/silver molar ratio≥0.1) for achieving varying extent of improvement to prevent prematurely precipitation while exposed to ambient light. The complex solution aged in a transparent (not opaque) sample vial at room temperature remains clear without signs of precipitation for several days.

Below, exemplary embodiments will be described in detail with reference to accompanying drawings so as to be easily realized by a person having corresponding expertise in the art. The inventive concept may be embodied in various forms without being limited to the exemplary embodiments set forth herein. Descriptions of well-known parts are omitted for clarity, and like reference numerals refer to like elements throughout.

EXAMPLES

Comparative Example 1

Propylene diamine was added to and mixed with a silver nitrate aqueous solution (1M), where the propylene diamine to the silver ions had a molar concentration ratio of 2:1. Propylene diamine was added to and mixed with another silver nitrate aqueous solution (1M), where the propylene diamine to the silver ions had a molar concentration ratio of 3:1. Propylene diamine was added to and mixed with yet another silver nitrate aqueous solution (1M), where the propylene diamine and the silver ions had a molar concentration ratio of 4:1. The silver-containing solutions containing silver nitrate and propylene diamine of various concentrations were aged in an environment of ambient light, room temperature, and normal pressure for different time periods prior to measure their corresponding light transmittance, as shown in FIGS. 2A to 2D respectively. The aqueous solution containing only silver nitrate produced precipitation of black particulates after being aged for 48 hours. On the other hand, the silver-containing solution where propylene diamine to silver ions had the molar concentration of 3:1 or 4:1, appeared clear without any precipitation after being aged for 7 days at the same environment condition, as approved by exhibiting a greater light transmittance. When molar ratio of propylene diamine to silver ions was dropped to 2:1, the silver-containing solution appeared opaque with an extensive precipitation of suspending particulates after being aged for 7 days at the ambient environment.

Example 1

Ethylene diamine and citric acid were added to and mixed with a silver nitrate in an aqueous solution (1M), where ethylene diamine to silver ions had a molar concentration ratio of 2:1, and the citric acid to silver ions had a molar ratio of 0.1:1. In other set of solution, ethylene diamine and citric acid were added to and mixed with silver nitrate in an aqueous solution (1M), where ethylene diamine to silver ions had a molar concentration ratio of 3:1, and the citric acid to silver ions had a molar ratio of 0.1:1. In still another set of solution, ethylene diamine and citric acid were added to and mixed with silver nitrate in an aqueous solution (1M), where ethylene diamine to silver ions had a molar concentration ratio of 4:1, and citric acid to silver ions had a molar ratio of 0.1:1. The silver-containing solutions containing silver nitrate, citric acid, and ethylene diamine of various concentrations were aged in an environment of ambient light, room temperature, and normal pressure for different time periods prior to measure their corresponding light transmittance, as shown in FIGS. 3A to 3D respectively. The aqueous solution containing only silver nitrate produced precipitation of black particulates after being aged for 48 hours. It appeared that adding citric acid and ethylene diamine in both could improve the stability of the silver-containing solutions to such that the solutions exhibited no precipitates in 48 hours. The silver-containing solution where ethylene diamine to silver ions had the molar concentration of 3:1, appeared relatively clear without any precipitation after being aged for 15 days, as approved by exhibiting a greater light transmittance.

Example 2

Ethylene diamine and citric acid were both added to and mixed with a silver nitrate in an aqueous solution (1M), where ethylene diamine to silver ions had a molar concentration ratio of 2:1, and the citric acid to silver ions had a molar ratio of 0.2:1. In other set of solution, ethylene diamine and citric acid were added to and mixed with silver nitrate in an aqueous solution (1M), where ethylene diamine to silver ions had a molar concentration ratio of 3:1, and the citric acid to silver ions had a molar ratio of 0.2:1. In still another set of solution, ethylene diamine and citric acid were added to and mixed with silver nitrate in an aqueous solution (1M), where ethylene diamine to silver ions had a molar concentration ratio of 4:1, and citric acid to silver ions had a molar ratio of 0.2:1. The silver-containing solutions containing silver nitrate, citric acid, and ethylene diamine of various concentrations were aged in an environment of ambient light, room temperature, and normal pressure for different time periods prior to measure their corresponding light transmittance, as shown in FIGS. 4A to 4D respectively. The silver nitrate aqueous solution containing only silver nitrate produced precipitation of black particulates after being aged for 48 hours. It appeared that adding citric acid and ethylene diamine in both could improve the stability of the silver-containing solutions to such that the solutions exhibited no precipitates in 48 hours. The silver-containing solution where ethylene diamine to silver ions had the molar concentration of 3:1 or 4:1, appeared clear without any precipitation after being aged for 15 days, as approved by exhibiting a greater light transmittance. Compared to Example 1, the citric acid of the higher concentration in Example 2 could further improve the stability of the silver-containing solutions of the same constitutes.

Example 3

Propylene diamine and oxalic acid were both added to and mixed with silver nitrate in an aqueous solution (1M), where propylene diamine to silver ions had a molar concentration ratio of 2:1, and the oxalic acid to silver ions had a molar ratio of 0.1:1. In other set of solution, propylene diamine and oxalic acid were added to and mixed with silver nitrate in an aqueous solution (1M), where propylene diamine to silver ions had a molar concentration ratio of 3:1, and the oxalic acid to silver ions had a molar ratio of 0.1:1. In still another set of solution, propylene diamine and oxalic acid were added to and mixed with silver nitrate in an aqueous solution (1M), where propylene diamine to silver ions had a molar concentration ratio of 4:1, and oxalic acid to silver ions had a molar ratio of 0.1:1. The silver-containing solutions containing silver nitrate, oxalic acid, and propylene diamine of various various concentrations were aged in an environment of ambient light, room temperature, and normal pressure for different time periods prior to measure their corresponding light transmittance, as shown in FIGS. 5A to 5D respectively. The silver nitrate aqueous solution containing only silver nitrate produced precipitation of black particulates after being aged for 48 hours. It appeared that adding oxalic acid and propylene diamine in both could improve the stability of the silver-containing solutions to such that the solutions exhibited no precipitates in 48 hours. The silver-containing solution where propylene diamine to silver ions had the molar concentration of 3:1 or 4:1, appeared clear without any precipitation after being aged for 15 days, as approved by exhibiting a greater light transmittance.

Example 4

Propylene diamine and formic acid were both added to and mixed with a silver nitrate in an aqueous solution (1M), where propylene diamine to silver ions had a molar concentration ratio of 2:1, and the formic acid to silver ions had a molar ratio of 0.1:1. In other set of solution, propylene diamine and formic acid were added to and mixed with silver nitrate in an aqueous solution (1M), where propylene diamine to silver ions had a molar concentration ratio of 3:1, and the formic acid to silver ions had a molar ratio of 0.1:1. In still another set of solution, propylene diamine and formic acid were added to and mixed with silver nitrate in an aqueous solution (1M), where propylene diamine to silver ions had a molar concentration ratio of 4:1, and formic acid to silver ions had a molar ratio of 0.1:1. The silver-containing solutions containing silver nitrate, formic acid, and propylene diamine of various concentrations were aged in an environment of ambient light, room temperature, and normal pressure for different time periods prior to measure their corresponding light transmittance, as shown in FIGS. 6A to 6D respectively. The silver nitrate aqueous solution containing only silver nitrate produced precipitation of black particulates after being aged for 48 hours. It appeared that adding formic acid and propylene diamine in both could improve the stability of the silver-containing solutions to such that the solutions exhibited no precipitates in 48 hours. The silver-containing solution where propylene diamine to silver ions had the molar concentration of 2:1, 3:1, or 4:1, appeared clear without any precipitation after being aged for 15 days, as approved by exhibiting a greater light transmittance. Compared to Examples 1 to 3, the effect of formic acid to improve the stability of the silver-containing solution appears outstanding even added with low concentration.

Example 5

Glass slides were surface-roughed to serve as substrates. The silver-containing solutions of oxalic acid and ethylene diamine of different concentrations in Example 3 were diluted 20 times, and then coated on the respective substrates. The substrates were then treated by nitrogen plasma for 60 seconds to form silver catalyst layers. Copper sulfate (2.5 g/mL) and formaldehyde (6 mL/L) were mixed in water to form a solution, and then adjusted pH to a value of about 12.5, thereby forming a bath for chemically plating copper. The substrates having the silver catalyst layers thereon were immersed in the copper plating bath heated beforehand (e.g. 55° C. to 60° C.), which started catalytically plating copper in 30 seconds, and subsequently over all surface where the silver layers were covered.

Glass slides were surface-roughed to serve as substrates. The silver-containing solutions of oxalic acid and ethylene diamine of different concentrations in Example 3 were diluted 20 times, and then coated on the respective substrates. The substrates were then exposed to ultraviolet radiation (1.5 J/cm$^2$) to form silver catalyst layers. Copper sulfate (2.5 g/mL) and formaldehyde (6 mL/L) were mixed in water to form a solution, and then adjusted pH to a value of about 12.5, thereby forming a bath for chemically plating copper. The substrates having the silver catalyst layers thereon were immersed in the copper plating bath heated beforehand (e.g. 55° C. to 60° C.), which started catalytically plating copper in 30 seconds, and subsequently over all surface where the silver layers were covered.

Glass slides were surface-roughed to serve as substrates. The silver-containing solutions of formic acid and propylene diamine of different concentrations in Example 4 were diluted 20 times, and then coated on the respective substrates. The substrates were then exposed to ultraviolet radiation (1.5 J/cm$^2$) to form silver catalyst layers. Copper sulfate (2.5 g/mL) and formaldehyde (6 mL/L) were mixed in water to form a solution, and then adjusted pH to a value of about 12.5, thereby forming a bath for chemically plating copper. The substrates having the silver catalyst layers thereon were immersed in the copper plating bath heated beforehand (e.g. 55° C. to 60° C.), which started catalytically plating copper in 30 seconds, and subsequently over all surface where the silver layers were covered.

Example 6

Glass slides were surface-roughed to serve as substrates. The silver-containing solutions of oxalic acid and ethylene diamine of different concentrations in Example 3 were diluted 20 times, and then coated on the respective substrates. The substrates were then treated by nitrogen plasma for 60 seconds to form silver catalyst layers. Nickel sulfate (7 g/mL) and sodium borohydride (5.5 g/L) were mixed in water to form a solution, and then adjusted pH to a value of about 8.5, thereby forming a bath for chemically plating nickel. The substrates having the silver catalyst layers thereon were immersed in the nickel plating bath heated beforehand (e.g. 45° C. to 50° C.), which started catalytically plating nickel in 30 seconds, and subsequently over all surface where the silver layers were covered.

Glass slides were surface-roughed to serve as substrates. The silver-containing solutions of oxalic acid and ethylene diamine of different concentrations in Example 3 were diluted 20 times, and then coated on the respective substrates. The substrates were then exposed to ultraviolet radiation (1.5 J/cm$^2$) to from silver catalyst layers. Nickel sulfate (7 g/mL) and sodium borohydride (5.5 g/L) were mixed in water to form a solution, and then adjusted pH to a value of about 8.5, thereby forming a bath for chemically plating nickel. The substrates having the silver catalyst layers thereon were respectively immersed in the nickel plating bath heated beforehand (e.g. 45° C. to 50° C.), which started catalytically plating nickel in 30 seconds, and subsequently over all surface where the silver layers were covered.

Glass slides were surface-roughed to serve as substrates. The silver-containing solutions of formic acid and propylene diamine of different concentrations in Example 4 were diluted 20 times, and then coated on the respective substrates. The substrates were then exposed to ultraviolet radiation (1.5 J/cm$^2$) to form silver catalyst layers. Nickel sulfate (7 g/mL) and sodium borohydride (5.5 g/L) were mixed in water to form a solution, and then adjusted pH to a value of about 8.5, thereby forming a bath for chemically plating nickel. The substrates having the silver catalyst layers thereon were respectively immersed in the nickel plating bath heated beforehand (e.g. 45° C. to 50° C.), which started catalytically plating nickel in 30 seconds, and subsequently over all surface where the silver layers were covered.

Accordingly, the silver-containing solutions provided in Examples of the disclosure can be stably stored for a long time. And later on, can be activated with a formation energy to form silver catalyst layers capable of triggering a plating process of copper or of nickel. Compared to conventional palladium catalyst, the cost of such a silver catalyst is substantially lower.

Comparative Example 2 (Insufficient Diamine Compound)

Figure 7:
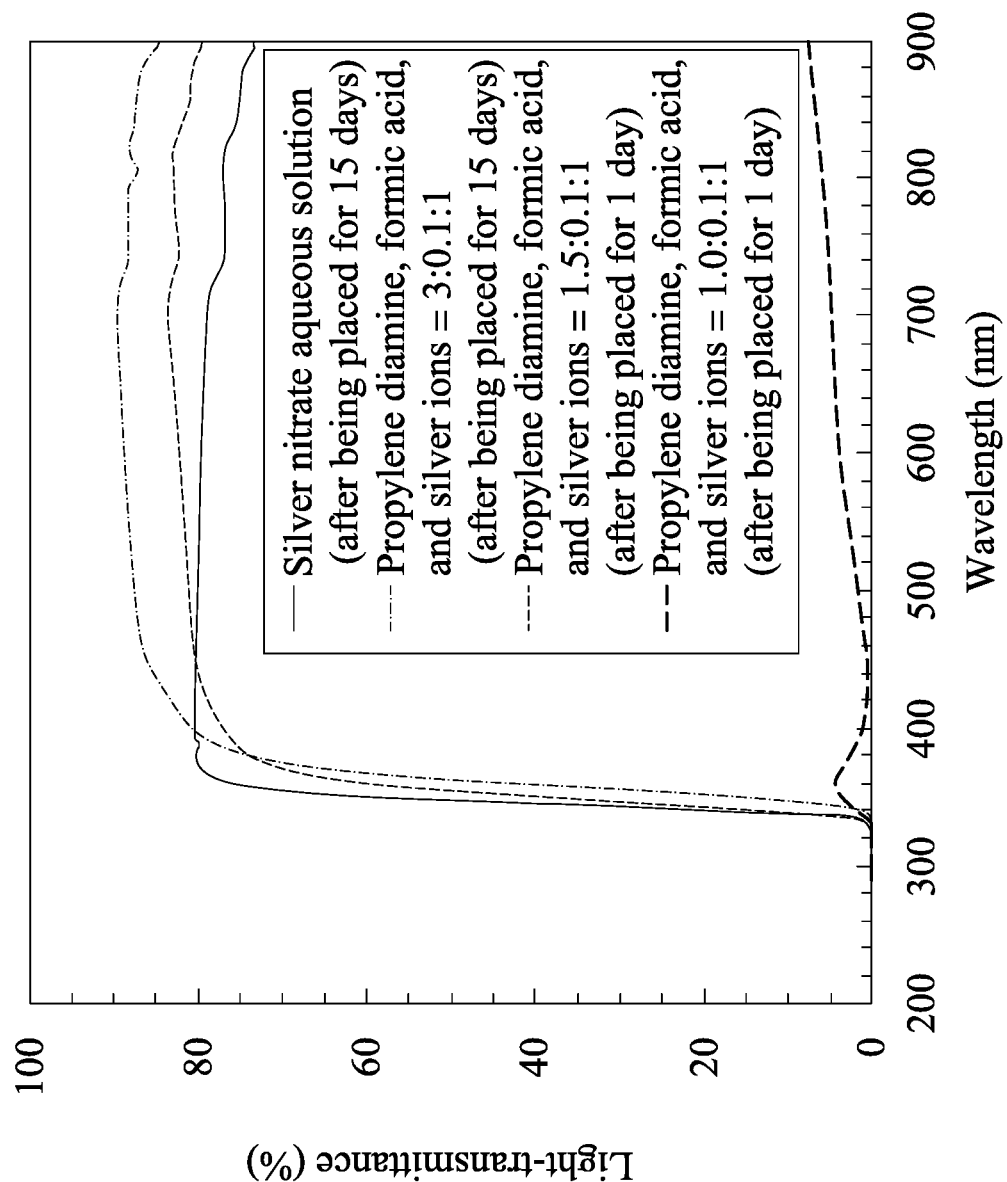
FIG. 7 shows the light-transmittance spectra of the silver-containing solutions in one embodiment of the disclosure.

Propylene diamine and formic acid were added in both to and mixed with a silver nitrate in an aqueous solution (1M), where propylene diamine to silver ions had a molar concentration ratio of 1:1, and formic acid to silver ions had a molar ratio of 0.1:1. The silver-containing solution was aged in an environment of ambient light, room temperature, and normal pressure for different time periods prior to measure its light transmittance, as shown in FIG. 7. The silver-containing solution was gradually changed to gray dark in 1 hour after preparation, and produced precipitation of black particulates on the vessel walls which became almost opaque after being prolong aged for 24 hours. In other set of solution, propylene diamine and formic acid were added in both to and mixed with silver nitrate in an aqueous solution (1M), where propylene diamine to silver ions had a molar concentration ratio of 1.5:1, and formic acid to silver ions had a molar ratio of 0.1:1. In still another set of solution, propylene diamine and formic acid were added to and mixed with silver nitrate in an aqueous solution (1M), where propylene diamine to silver ions had a molar concentration ratio of 3:1, and formic acid to silver ions had a molar ratio of 0.1:1. The silver-containing solutions containing silver nitrate, formic acid, and propylene diamine of various concentrations were aged in an environment of ambient light, room temperature, and normal pressure for different time periods prior to measure their corresponding light transmittance, as shown in FIG. 7. The solutions containing only silver nitrate changed to suspension with black particles after being aged for 24 hours. Compared to solution having propylene diamine to silver ions ratio (molar) of 3:1, the light-transmittance of solution having propylene diamine to silver ions ratio (molar) of 1.5:1 was decreased more quickly with time. However, compared to solution having propylene diamine to silver ions ratio (molar) of 1:1 precipitation and blackened in short time, the stability of the solution having propylene diamine to silver ions ratio (molar) of 1.5:1 still improve to a certain extent. It was observed that the stability of the silver-containing solution could not be effectively improved by adding an insufficient amount of diamine compound.

Comparative Example 3 (Insufficient Carboxylic Acid Compound)

Figure 8:
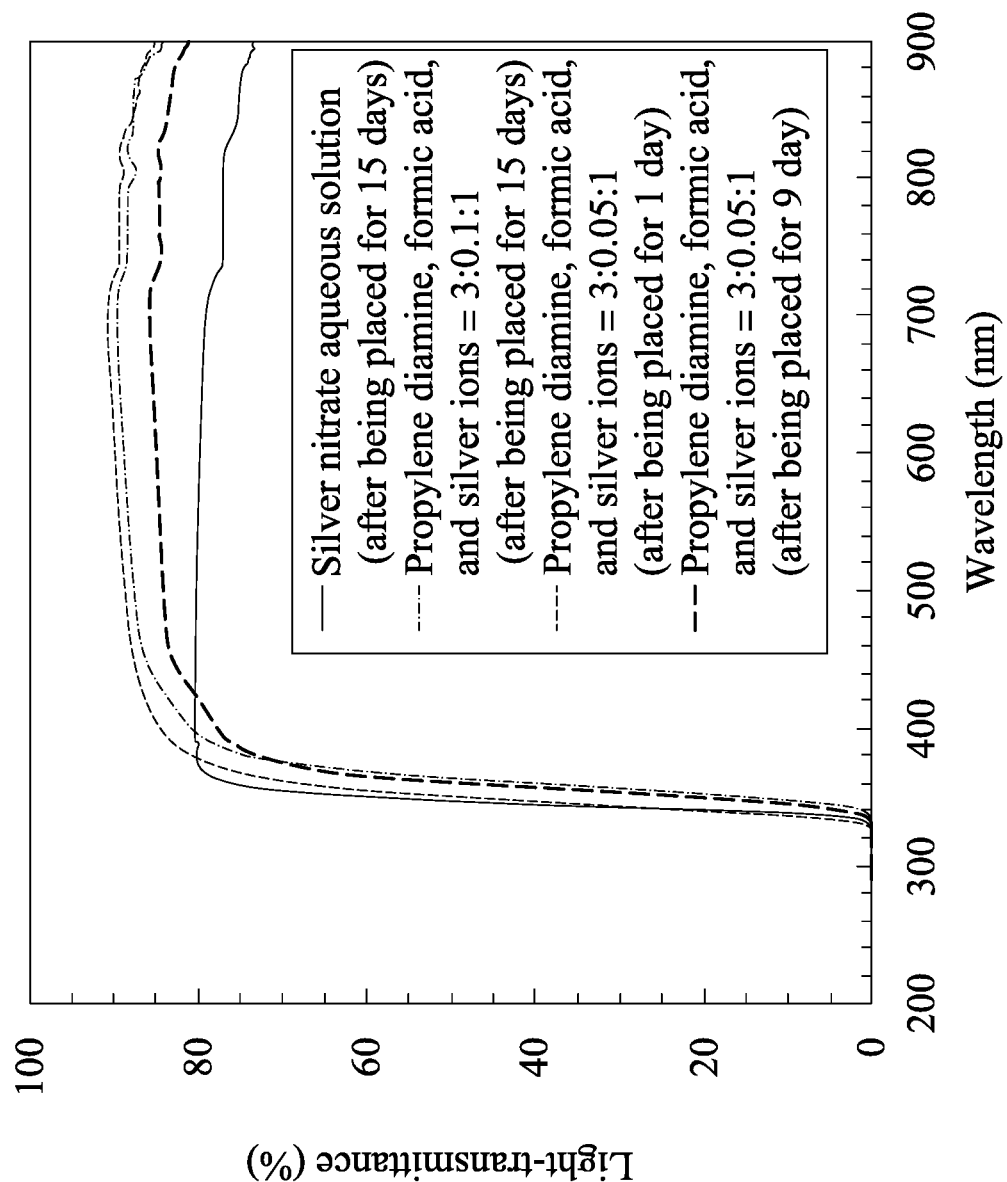
FIG. 8 shows the light-transmittance spectra of the silver-containing solutions in one embodiment of the disclosure.

Propylene diamine and formic acid were added in both to and mixed with a silver nitrate in an aqueous solution (1M), where propylene diamine to silver ions had a molar concentration ratio of 3:1, and formic acid to silver ions had a molar ratio of 0.05:1. The solution was aged in an environment of ambient light, room temperature, and normal pressure for different time periods prior to measure its corresponding light transmittance, as shown in FIG. 8. The solution appeared clear after being aged for 24 hours, but however, changed to a suspension with black particles which blocked its light-transmittance after being prolong aged for 9 days. In other set of solution, propylene diamine and formic acid were added in both to and mixed with silver nitrate in an aqueous solution (1M), where propylene diamine to silver ions had a molar concentration ratio of 3:1, and the formic acid to silver ions had a molar ratio of 0.1:1. This silver-containing solution appeared rather clear and observed no precipitates after being aged for 15 days. It was observed that the stability of silver-containing solution could not be ensured for a long time while an insufficient amount of carboxylic acid compound was added.

Comparative Example 4 (Too Much Carboxylic Acid Compound)

Figure 9:
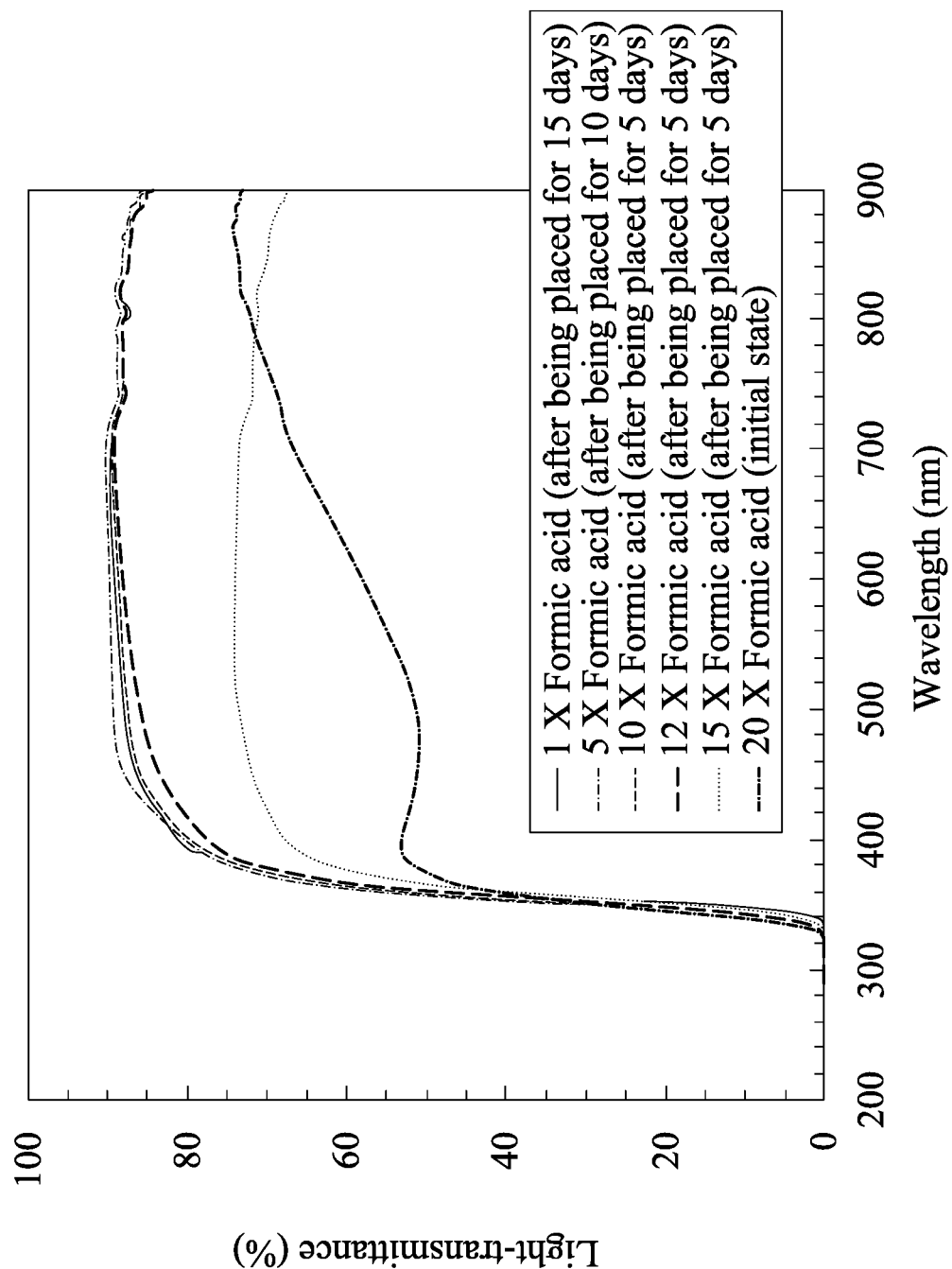
FIG. 9 shows the light-transmittance spectra of the silver-containing solutions in one embodiment of the disclosure.

Propylene diamine and formic acid were added in both to and mixed with a silver nitrate in an aqueous solution (1M), where propylene diamine to silver ions had a molar concentration ratio of 3:1, and formic acid to silver ions had a molar ratio of 0.1:1 (designated as standard 1×). Too much formic acid in the solution would destroy the stable complex formed from silver ions with amino group, and promote reduction and precipitation of certain silver compounds. As shown in FIG. 9, when the amount of formic acid was increased 20 times (designated as 20×), the silver-containing solution precipitated substantially, and even produced sedimentation on bottom of the vessel prematurely after just being aged for less than one hours. When the molar concentration ratio of formic acid to silver ions was increased 5 times (designated as 5×), the silver-containing solution appeared clear, and maintained its clarity after being aged for an extended period of time as showing no obvious change in 10 days. The effect of formic acid concentration to the silver complex up to a ratio equal to or less than 10× appears positive and acceptable. Adding formic acid up to a concentration ratio greater than 12× was however not so beneficial, because the concern of strong reducing potential of excess formic acid which caused symptom of particulate precipitation of the solution after being aged for 5 days as indicated by the light transmittance spectra shown in FIG. 9. As a general rule, additives which are not easily decomposed should be added as few as possible to avoid polluting or shielding active sites of silver surface. Therefore, dosage of carboxylic acid compound should be within a certain range, beyond or less both would result no beneficial effect to the stability of the silver-containing solution.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A silver-containing solution, consisting of:
   silver ions;
   a diamine compound;
   a carboxylic acid compound; and
   a solvent.

2. The silver-containing solution as claimed in claim 1, wherein the silver-containing solution has a silver ion concentration of 0.01 M to 10 M.

3. The silver-containing solution as claimed in claim 1, wherein the diamine compound comprises ethylene diamine, propylene diamine, or a combination thereof, and the diamine to the silver ions have a molar concentration ratio of 2.5:1 to 200:1.

4. The silver-containing solution as claimed in claim 1, wherein the carboxylic acid compound comprises formic acid, acetic acid, citric acid, oxalic acid, malic acid, or a combination thereof, and the carboxylic acid compound to the silver ions have a molar concentration ratio of 0.1:1 to 1.2:1.

5. The silver-containing solution as claimed in claim 1, wherein the solvent comprises water, alcohol, or a combination thereof.

6. A silver-containing solution consisting of:
    silver ions;
    a diamine compound;
    a carboxylic acid compound;
    a solvent; and
    a dispersant.

7. A method of forming a silver catalyst layer in chemical plating, comprising:
    providing a substrate;
    applying a silver-containing solution onto the substrate;
    applying energy of activation to the silver-containing solution to form a silver catalyst layer over the substrate;
    wherein the silver-containing solution is consisting of:
    silver ions;
    a diamine compound;
    a carboxylic acid compound; and
    a solvent.

8. The method as claimed in claim 7, wherein the silver-containing solution has a silver ion concentration of 0.01 M to 10 M.

9. The method as claimed in claim 7, wherein the diamine compound comprises ethylene diamine, propylene diamine, or a combination thereof, and the diamine to the silver ions have a molar concentration ratio of 2.5:1 to 200:1.

10. The method as claimed in claim 7, wherein the carboxylic acid compound comprises formic acid, acetic acid, citric acid, oxalic acid, malic acid, or a combination thereof, and the carboxylic acid compound to the silver ions have a molar concentration ratio of 0.1:1 to 1.2:1.

11. The method as claimed in claim 7, wherein the solvent comprises water, alcohol, or a combination thereof.

12. The method as claimed in claim 7, further comprising immersing the substrate having the silver catalyst layer thereon into a chemical plating solution to form a metal layer over the silver catalyst layer.

13. A method of forming a silver catalyst layer in chemical plating, comprising:
    providing a substrate;
    applying a silver-containing solution onto the substrate;
    applying energy of activation to the silver-containing solution to form a silver catalyst layer over the substrate,
    wherein the silver-containing solution is consisting of:
    silver ions;
    a diamine compound;
    a carboxylic acid compound;
    a solvent; and
    a dispersant.

14. The method as claimed in claim 7, wherein the energy of activation comprises plasma, pulsed light, ultraviolet radiation, or laser.

15. The method as claimed in claim 12, wherein the chemical plating solution includes copper ions or nickel ions, and the metal layer includes a copper layer or a nickel layer.

* * * * *